US006999087B2

(12) United States Patent
Lavelle et al.

(10) Patent No.: US 6,999,087 B2
(45) Date of Patent: Feb. 14, 2006

(54) DYNAMICALLY ADJUSTING SAMPLE DENSITY IN A GRAPHICS SYSTEM

(75) Inventors: Michael G. Lavelle, Saratoga, CA (US); Justin Michael Mahan, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 234 days.

(21) Appl. No.: 10/383,165

(22) Filed: Mar. 6, 2003

(65) Prior Publication Data

US 2003/0218614 A1 Nov. 27, 2003

Related U.S. Application Data

(60) Provisional application No. 60/363,596, filed on Mar. 12, 2002.

(51) Int. Cl.
G06F 12/02 (2006.01)

(52) U.S. Cl. .................. 345/543; 345/545; 345/531; 345/503; 345/611; 345/613

(58) Field of Classification Search ................. 345/419, 345/581, 589, 611, 613, 503, 531, 543, 545
See application file for complete search history.

(56) References Cited

U.S. PATENT DOCUMENTS 5,757,375 A * 5/1998 Kawase ...................... 345/613

6,313,838 B1 * 11/2001 Deering ....................... 345/420
6,661,424 B1 * 12/2003 Alcorn et al. ................ 345/611
6,697,063 B1 *  2/2004 Zhu ............................ 345/421
2001/0048435 A1 * 12/2001 Deering et al. ............. 345/582
2002/0005862 A1    1/2002 Deering

FOREIGN PATENT DOCUMENTS

| WO | WO 99/41706 | 8/1999 |
| WO | WO 00/00934 | 1/2000 |
| WO | WO 00/49577 | 8/2000 |

* cited by examiner

Primary Examiner—Ulka J. Chauhan
(74) Attorney, Agent, or Firm—Meyertons Hood Kivlin Kowert & Goetzel, P.C.; Jeffrey C. Hood; Mark K. Brightwell

(57) ABSTRACT

A graphics system may include a frame buffer and a hardware accelerator. The frame buffer may include a sample buffer and a double-buffered display area. The hardware accelerator may be coupled to the frame buffer, and configured (a) to receive primitives, (b) to generate samples for the primitives based on a dynamically adjustable sample density value, (c) to write the samples into the sample buffer, (d) to read the samples from the sample buffer, (e) to filter the samples to generate pixels, (f) to store the pixels in a back buffer of the double-buffered display area. A host computer may be configured (e.g., by means of stored program instructions) to dynamically update programmable registers of the graphics system to reallocate the sample buffer in the frame buffer in response to user input specifying a change in one or more window size parameters.

19 Claims, 19 Drawing Sheets

Frame Buffer Bit Planes
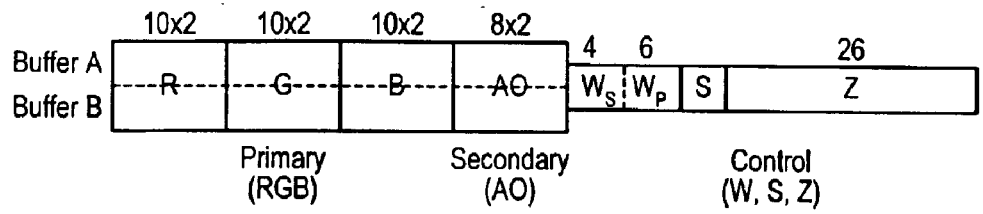
*FIG. 3*
Frame Buffer Bit Planes
| Name | Function | Bits | Buffered | Group |
|---|---|---|---|---|
| R | Red | 10 | Double | Primary |
| G | Red | 10 | Double | Primary |
| B | Red | 10 | Double | Primary |
| AO | Alpha/Overlay | 8 | Double | Secondary |
| Ws, Wp | Window IDs | 4,6 | Single | Control |
| S | Stencil | 4 | Single | Control |
| Z | Depth | 26 | Single | Control |
*FIG. 4*
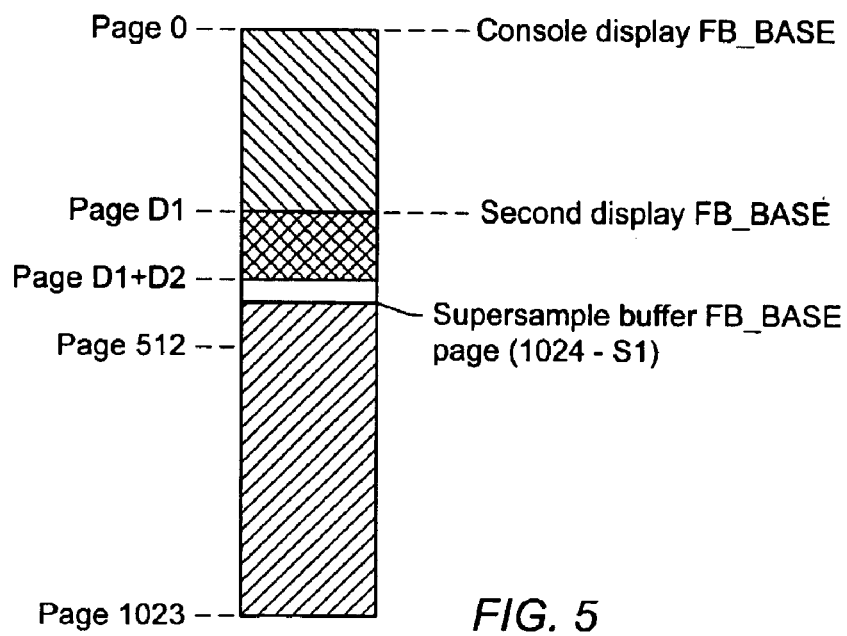
*FIG. 5*

**Memory Allocation Page Sizes in Pixels vs. FB_*_MODE**

| FB_*_MODE | Description | Page Width (pixels) | Page Height (pixels) |
|---|---|---|---|
| FB_*_MODE_NSTR | Display, non-stereo | 320 | 16 |
| FB_*_MODE_STR | Display, stereo | 320 | 8 |
| FB_*_MODE_NSTRNV | Offscreen pixel | 320 | 16 |
| FB_*_MODE_SD1 | Sample, density = 1 | 160 | 32 |
| FB_*_MODE_SD2<br>FB_*_MODE_SD2B | Sample, density = 2 | 80 | 32 |
| FB_*_MODE_SD3<br>FB_*_MODE_SD3B | Sample, density = 3 | 80 | 20 |
| FB_*_MODE_SD4<br>FB_*_MODE_SD4B | Sample, density = 4 | 80 | 16 |
| FB_*_MODE_SD5<br>FB_*_MODE_SD5B | Sample, density = 5 | 80 | 12 |
| FB_*_MODE_SD6<br>FB_*_MODE_SD6B | Sample, density = 6 | 40 | 20 |
| FB_*_MODE_SD8<br>FB_*_MODE_SD8B | Sample, density = 8 | 40 | 16 |
| FB_*_MODE_SD10<br>FB_*_MODE_SD10B | Sample, density = 10 | 40 | 12 |
| FB_*_MODE_SD16<br>FB_*_MODE_SD16B | Sample, density = 16 | 40 | 8 |

*FIG. 6*

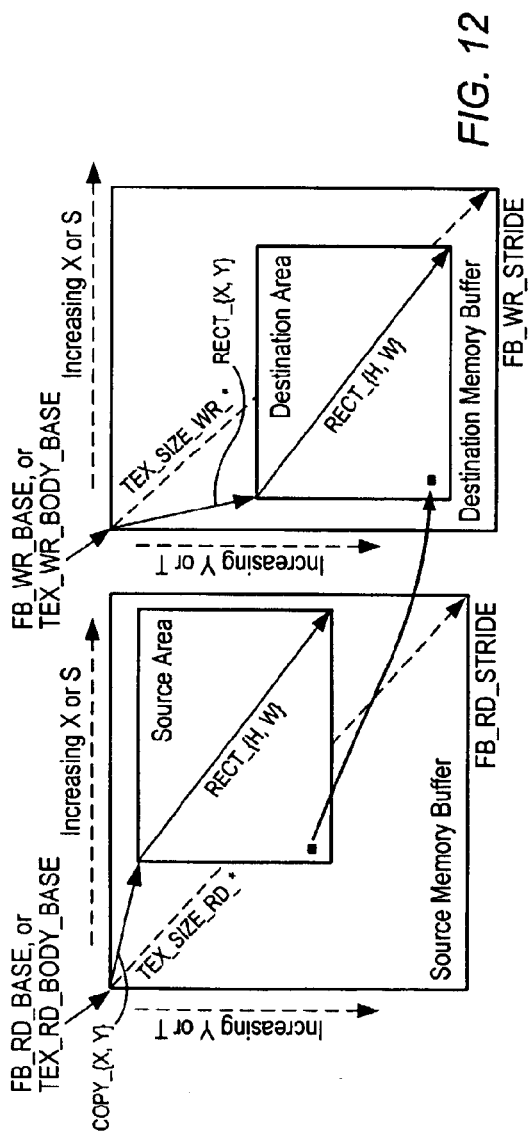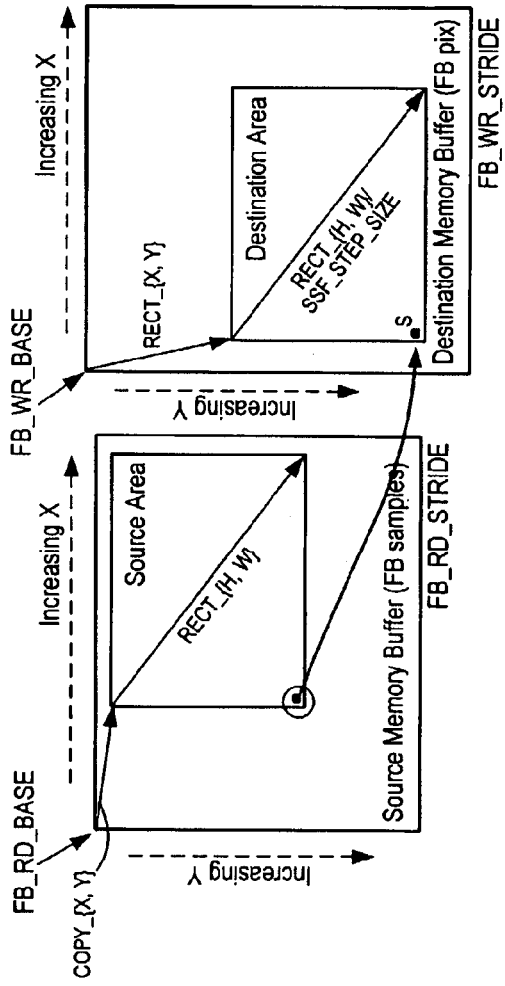
FIG. 12
FIG. 13

DYNAMICALLY ADJUSTING SAMPLE DENSITY IN A GRAPHICS SYSTEM

PRIORITY CLAIM

This application claims the benefit of U.S. Provisional Application No. 60/363,596 filed on Mar. 12, 2002 entitled "Dynamically Adjusting Sample Density and/or Number of Rendering Passes in a Graphics System".

BACKGROUND OF THE INVENTION

1. Field of the Invention

This invention relates generally to the field of computer graphics and, more particularly, to a graphics system configured to dynamically adjust the size of sample storage area within a frame buffer to achieve (or approach) maximum sample density in response to changes in window size.

2. Description of the Related Art

A graphical computing system may perform supersampling, i.e., may generate samples at higher than pixel resolution, and may filter the samples to generate pixels. Final image quality is in part dependent on the sample density (i.e., the number of samples generated per unit pixel area). Furthermore, a graphical computing systems may be configured to operate in a windowing environment in which a user may resize an onscreen window. Unfortunately, many graphical computing systems are not configured in a manner that allows sample density to be increased when window size is reduced. Thus, image quality suffers when windows are reduced in size. Thus, there exists a need for a system and method capable of dynamically adjusting supersample density in response to adjustments in window size.

SUMMARY

In various embodiments, a graphics system may include a frame buffer and a hardware accelerator. The frame buffer may include a sample buffer and a double-buffered display area. The hardware accelerator may be coupled to the frame buffer, and configured (a) to receive primitives, (b) to generate samples for the primitives based on a dynamically adjustable sample density value, (c) to write the samples into the sample buffer, (d) to read the samples from the sample buffer, (e) to filter the samples to generate pixels, (f) to store the pixels in a back buffer of the double-buffered display area. A host computer may be configured (e.g., by means of stored program instructions) to dynamically update programmable registers of the graphics system to reallocate the sample buffer in the frame buffer in response to user input specifying a change in one or more window size parameters.

In one set of embodiments, a method for controlling a graphics accelerator may be arranged as follows. (The graphics accelerator is configured to render samples into an available space of a frame buffer based on a programmable sample density and to filter the samples from the sample buffer into a double-buffered display area of the frame buffer.) The method may involve:

(a) receiving input defining width and height of a window, (b) computing a first number of memory allocation pages that cover the window horizontally based on the window width and a sample density estimate;

(c) computing a second number of memory allocation pages that cover the window vertically based on the window height and the sample density estimate;

(d) multiplying the first number and second number to determine a third number of memory allocation pages;

(e) performing (b), (c) and (d) one or more times to maximize the sample density estimate subject to the condition that the third number of memory allocation pages fit within the available space of the frame buffer;

(f) reprogramming the sample density of the graphics accelerator with maximized sample density estimate.

This method allows the sample density to increase (decrease) in response to decreases (increases) in window size. Thus, per pixel image quality improves as the window size decreases.

BRIEF DESCRIPTION OF THE DRAWINGS

A better understanding of the present invention can be obtained when the following detailed description is considered in conjunction with the following drawings, in which:

FIGS. 3 and 4 illustrate an exemplary embodiment for the allocation of bit planes within a frame buffer data unit (e.g., pixel or sample);

FIG. 5 illustrates an example of the allocation of display buffers and supersample buffer in the frame buffer;

FIG. 6 illustrates one embodiment for memory allocation page sizes (in pixels) for various frame buffer modes;

FIG. 12 illustrates address generation for a pixel copy operation (i.e. for a frame buffer to frame buffer block copy operation);

FIG. 13 illustrates address generation for a sample filtering operation;

Figure 1A:
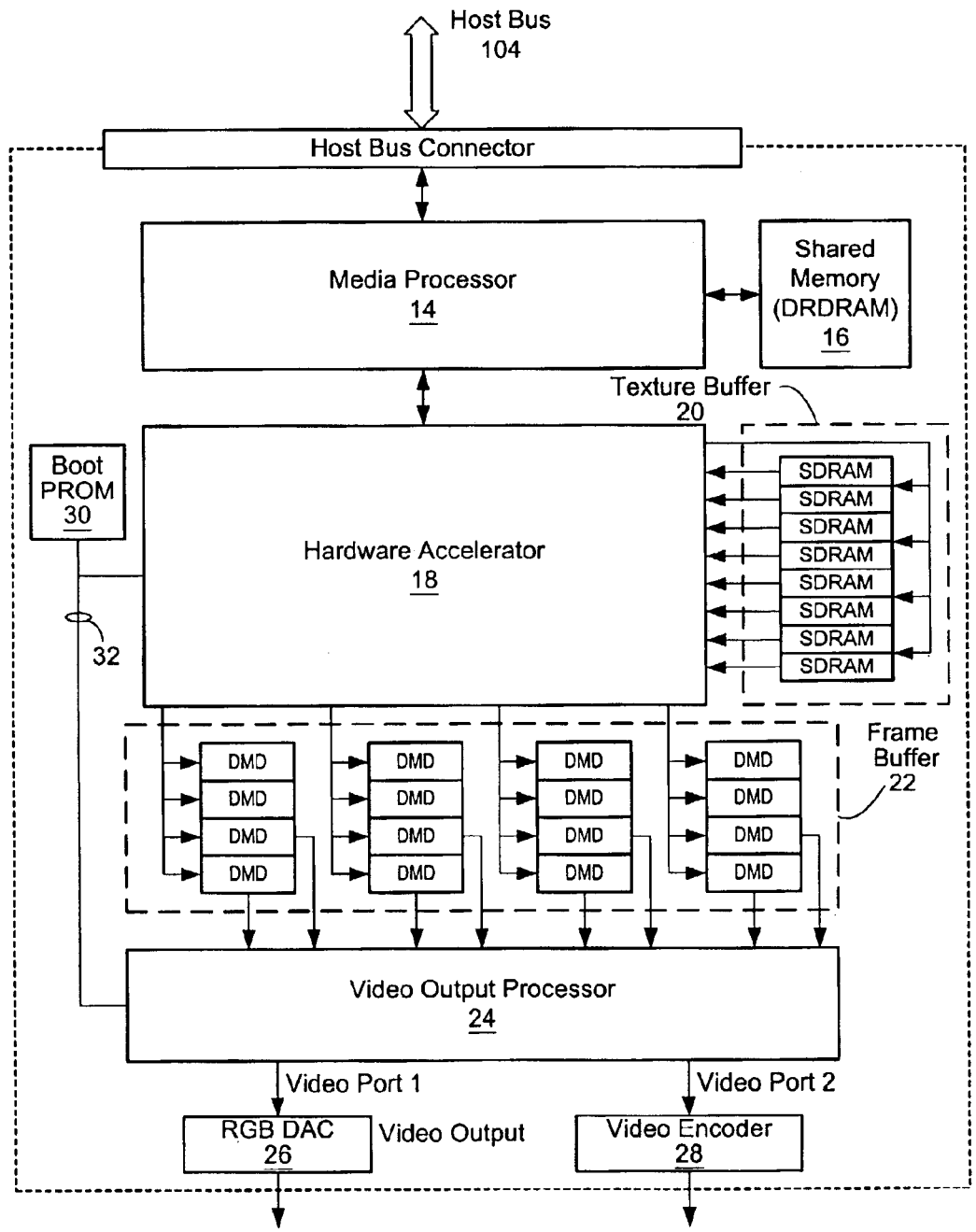
FIG. 1A illustrates one set of embodiments of a graphics rendering system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

In one set of embodiments, a graphics rendering system may include a media processor 14, a hardware accelerator (HA) 18, a frame buffer 22, and a video output processor 24 as suggested by FIG. 1A. The graphics rendering system may also include a host interface, a shared memory 11 (e.g., DRDRAM), a texture memory 20 (e.g., an array of SDRAM devices), a boot PROM 30, an RGB DAC 26, and a video encoder 28.

RAM is an acronym for random access memory.

SRAM is an acronym for static random access memory.

DRAM is an acronym for dynamic random access memory.

SDRAM is an acronym for synchronous dynamic random access memory.

RDRAM is an acronym for Rambus DRAM.

DRDRAM is an acronym for direct Rambus DRAM.

PROM is an acronym for programmable read-only memory

DAC is an acronym for digital-to-analog converter.

RGB is an acronym for red-green-blue.

The media processor 14 may receive a stream of graphics data defining primitives such as polygons, lines and dots from an external system (e.g. a host processor), and perform a number of preprocessing operations on the graphics data steam. The preprocessed graphics data may be forwarded to the hardware accelerator. The hardware accelerator may generate samples for the graphics primitives, and store the samples in a sample buffer allocated in the frame buffer. The hardware accelerator may read the samples from the sample buffer, filter the samples to generate pixels, and store the pixels in a double-buffered display buffer also allocated within the frame buffer. It is noted that a single frame of pixels may be composed from multiple passes of the sample rendering and sample filtering processes. The video output processor may read pixels from the display buffer, and generate a video output signal (or digital video stream) for output to a display device.

In one set of embodiments, the graphics rendering system has a number of features which are targeted for the efficient use of the limited-size sample buffer (allocated within the frame buffer memory).

1.0 System Architecture

FIG. 1A is a board level block diagram for one set of embodiments of the graphics rendering system.

Figure 1B:
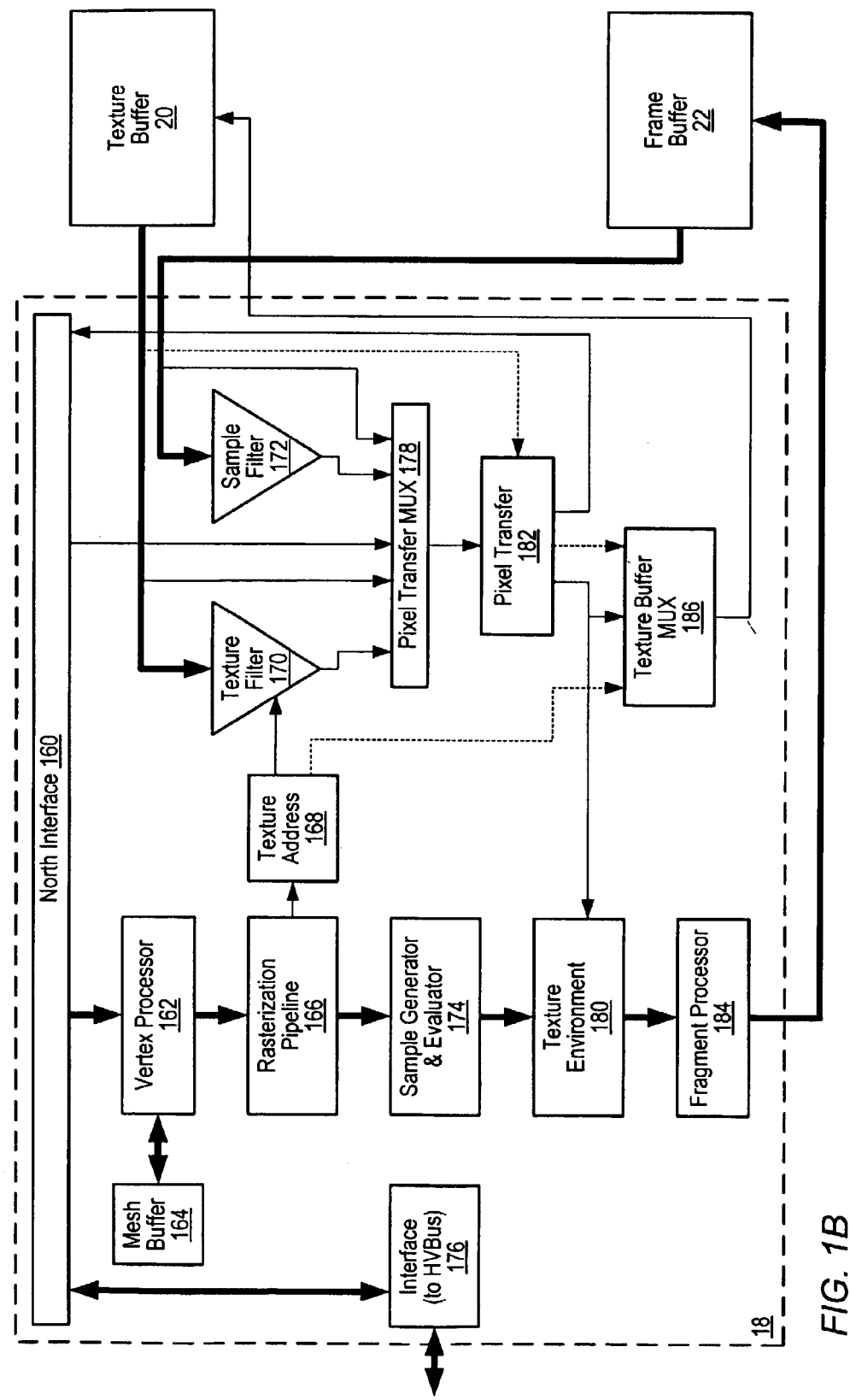
FIG. 1B illustrates one set of embodiments of a hardware accelerator within the graphics rendering system.
Figure 1C:
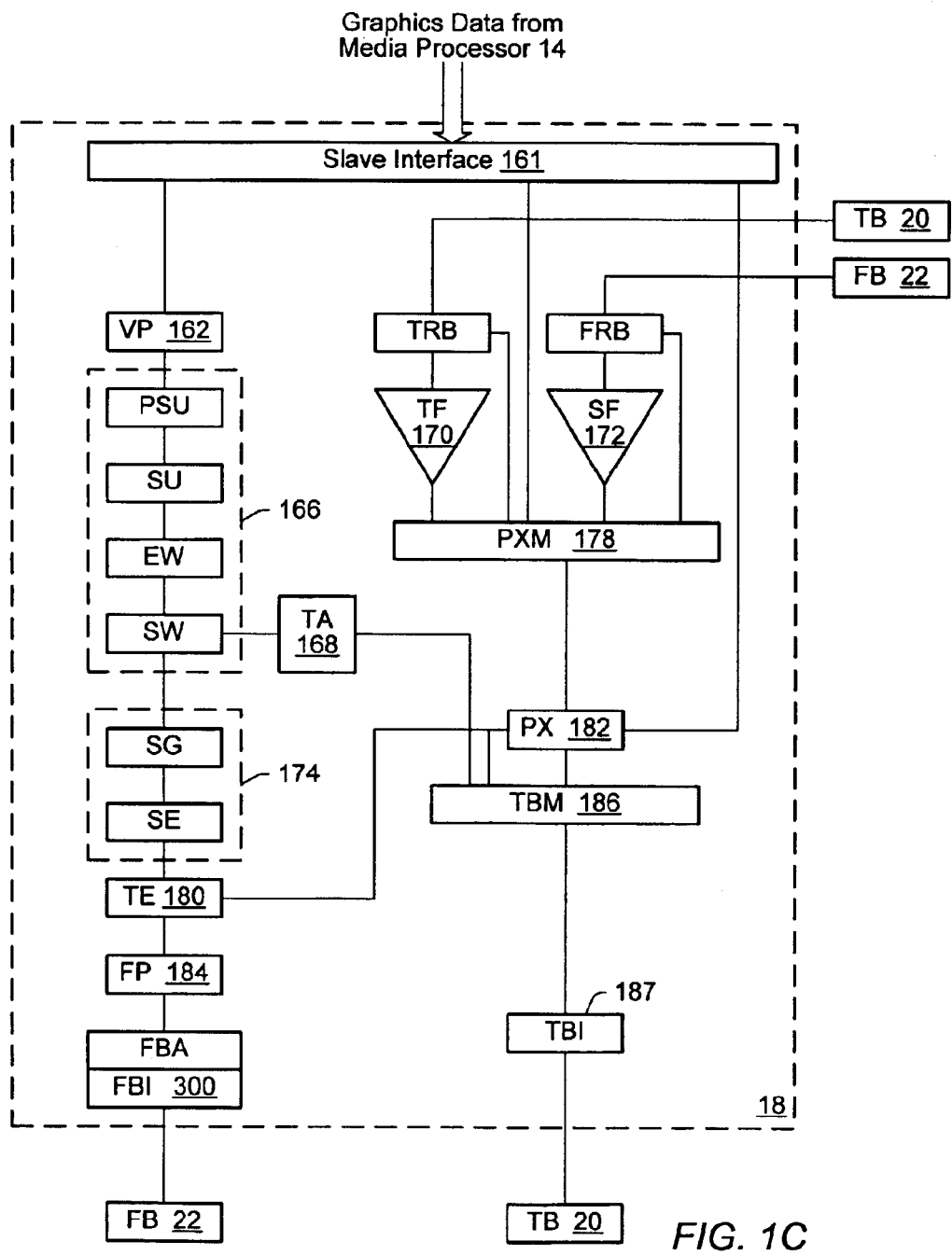
FIG. 1C illustrates another set of embodiments of a hardware accelerator within the graphics rendering system.
Figure 1D:
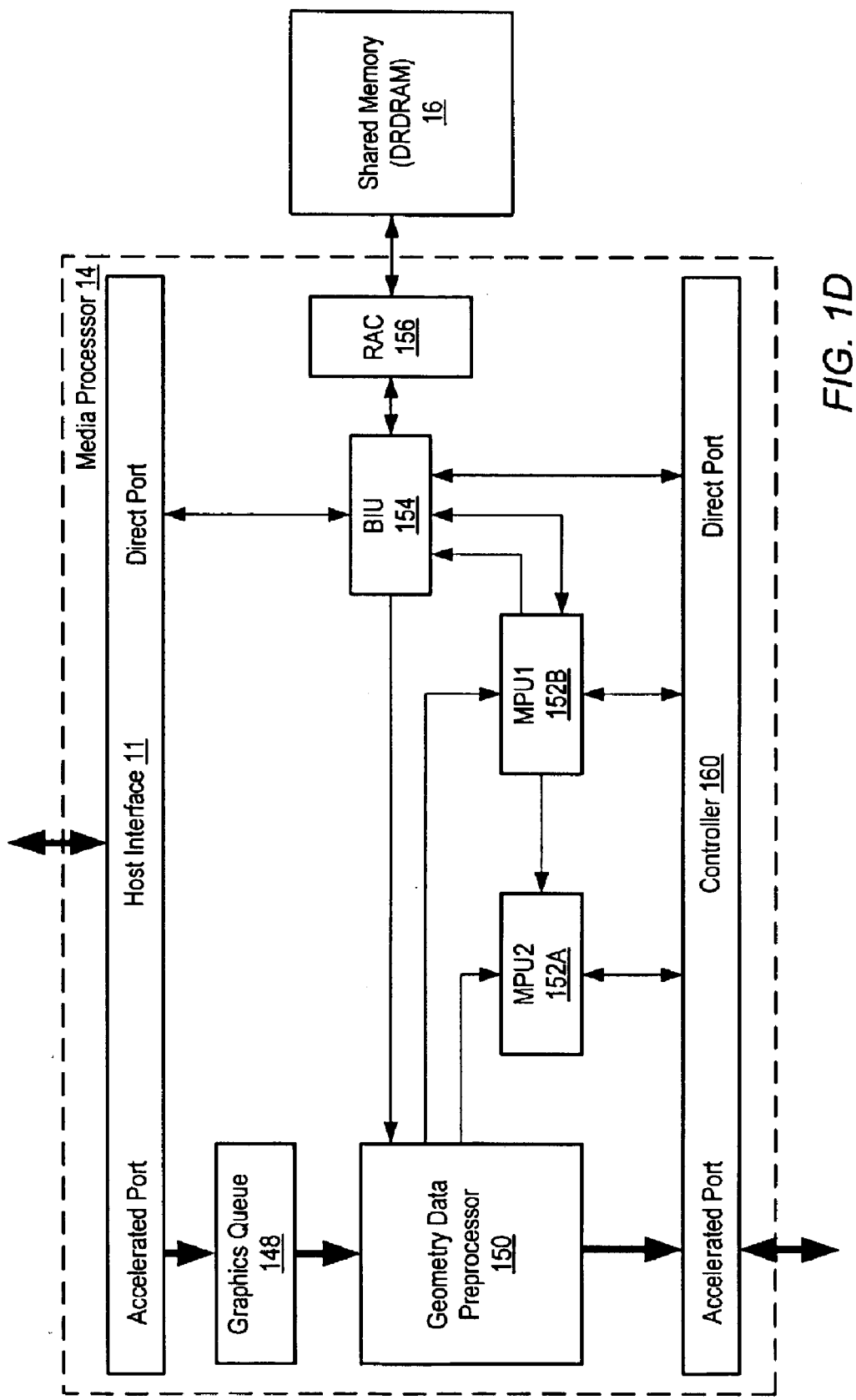
FIG. 1D illustrates one set of embodiments of a media processor within the graphics rendering system.

The media processor 14 may perform transform and lighting operations and other general-purpose processing operations on the received graphics data. The media processor may include a graphics preprocessor 150 and two processing units (PUs) running at $R_{PU}$ megahertz. FIG. 1D is a block diagram for one set of embodiments of the media processor.

The media processor 14 may use multiple bus interfaces. In one embodiment, the media processor includes a north interface 11 (e.g. an enhanced UPA64S interface), a direct RAMBUS interface 154, and a south interface 160. An external processor (e.g. a host processor) may use the north interface to control the graphics rendering system. The direct RAMBUS interface may support one or more DRAM memories. The south interface may be an extended variant of the UPA64S bus, and allows the media processor to control the hardware accelerator.

In one embodiment, the shared memory 16 may include two or more DRDRAM chips. The shared memory 16 may be used to store program instructions (e.g. microcode) and temporary data. The shared memory may also be used to store buffers for communications between the graphics rendering system and a host system, and to store context information for context switching. The shared memory may also be used as display list memory.

The hardware accelerator 18 may perform 2D and 3D rasterization, 2D and 3D texturing, pixel transfers, imaging operations, and fragment processing. FIG. 1B is a block diagram for one set of embodiments of the hardware accelerator 18. FIG. 1C is a more detailed block diagram of one embodiment of the hardware accelerator 18. The following is a legend for acronyms used in FIG. 1C.

VP=vertex processor.
PSU=presetup unit.
SU=setup unit.
EW=edge walker.
SW=span walker.
SG=sample generator.
SE=sample evaluator.
TE=texture environment.
FP=fragment pipeline.
FBA=frame buffer address unit.
FBI=frame buffer interface.
FB=frame buffer.
TA=texture address unit.
TRB=texture-buffer read buffer.
TF=texture filter.
FRB=frame-buffer read buffer.
SF=sample filter.
PXM=pixel transfer multiplexor.
PX=pixel transfer unit.
TBM=texture buffer multiplexor.

TBI=texture buffer interface.

The hardware accelerator 18 may have multiple interfaces. For example, in one embodiment, the hardware accelerator may have four interfaces including:

(a) a first interface 161 (e.g. an extended UPA64S interface) through which the hardware accelerator receives commands and/or data from the media processor;

(b) second interface 176 through which the hardware accelerator addresses the device boot PROM and controls the video output processor;

(c) a third interface 187 (e.g., for an eight-way interleaved texel bus) through which the hardware accelerator reads and writes the texture buffer 20;

(d) a fourth interface 300 (e.g., a four-way interleaved pixel bus) through which the hardware accelerator reads and writes the frame buffer 22.

The texture buffer memory 20 may include an array of SDRAMS (i.e. synchronous dynamic random access memories). For example, in one embodiment, the texture buffer may have eight SDRAMs. The texture buffer may be used to store texture maps, image processing buffers and accumulation buffers. The hardware accelerator 18 may read or write a set of $N_{TMA}$ bits of texture buffer data at SDRAM clock rates. For example, $N_{TMA}$ may equal 128 bits. However, a variety of other values for $N_{TMA}$ are possible and contemplated. In one set of embodiments, each pair of SDRAMs may be independently row and column addressable, to allow arbitrary addressing of 2×2 texture footprints. Furthermore, within each pair, the two SDRAMs may receive independent column addresses.

The frame buffer 22 may include an array of DRAM memory devices (DMDs). The array may include $N_{DRAM}$ of the DRAM memory devices. A first subset of the DRAM memory devices may be accessible by the hardware accelerator, and a second subset of the DRAM memory devices may be accessible by both the hardware accelerator and the video output processor 24. For example, in one embodiment, $N_{DRAM}$ may equal sixteen, and each subset may include eight of the DRAM memory devices. Furthermore, the 16 DRAM memory devices may organized into 4 ranks as suggested by FIG. 1A.

The hardware accelerator 18 may include a frame buffer interface 300. The frame buffer interface asserts address and control signals which control the flow of data into and out of the DRAM memory devices. The frame buffer interface may be configured to handle requests for frame buffer data (i.e. data stored in the frame buffer) asserted by the video output processor 24.

The storage capacity $C_{FB}$ of the frame buffer 22 may take any of wide variety of values. In one embodiment, the frame buffer may store 72 megabytes. The frame buffer may have a capacity of up to 5.2 million data items. A data item may represent a pixel or a sample. Each pixel of storage in the frame buffer may have 116 planes including:

60 bits of color information (i.e. 30 bit double-buffered RGB), 8 bits of alpha, 8 bits of overlay, 10 bits of window ID, 26 bits of z depth, 4 bits of stencil.

In one embodiment, the hardware accelerator 18 may write up to four pixels or eight samples in a single frame buffer clock, and may read four pixels or samples in two frame buffer clocks.

The DRAM memory devices (DMDs) of the frame buffer 22 may have serial output ports. In one embodiment, a first subset of eight DRAM memory devices may have their serial output ports coupled to the video output processor, and may be used to store displayable pixel buffers, offscreen pixel buffers or multisample buffers. A second subset of DRAM memory devices may not have connections to the video output processor, and thus, may be used to store offscreen pixel or multisample buffers. As a result, in one embodiment, the frame buffer may display up to 2.6 million pixels, and the sample buffer have store up to 5.2 million samples minus the number of displayed pixels. The terms multisample and supersample are used as synonyms herein.

The video output processor 24 may buffer and process the video data output from the first subset of DRAM memory devices. The video output processor may read video data from the DRAM memory devices in bursts. A burst may be $N_{burst}$ pixels in length. During the burst, $N_{cc}$ pixels may be transferred for every two video clocks. For example, in one embodiment, $N_{burst}$ may equal 160 and $N_{cc}$ may equal 8. It is noted that a wide variety of values may be assigned to $N_{burst}$ and $N_{cc}$. Video output processor may also be configured to perform gamma correction, pseudocolor color maps, and cursor generation. The video output processor may include two (or more) independent raster timing generators that provide two video output streams. For example, one of the video output streams may be provided to the RGB DAC 26 and one of the video output streams may be provided to the video encoder 28.

The RGB DAC 26 may provide a high resolution RGB analog video output at dot rates of up to $R_{dot}$ megahertz. For example, in one embodiment, $R_{dot}$ may equal 270 megahertz.

The video encoder 28 may provide an encoded NTSC or PAL video output to an S-video or composite video television monitor or recording device. NTSC is an abbreviation of National Television Standards Committee, a group responsible for defining television and video standards in the United States. PAL is an abbreviation for Phase Alternating Line (a dominant standard for television in Europe).

The boot PROM 30 may contain system initialization and frame buffer control code.

Figure 2:
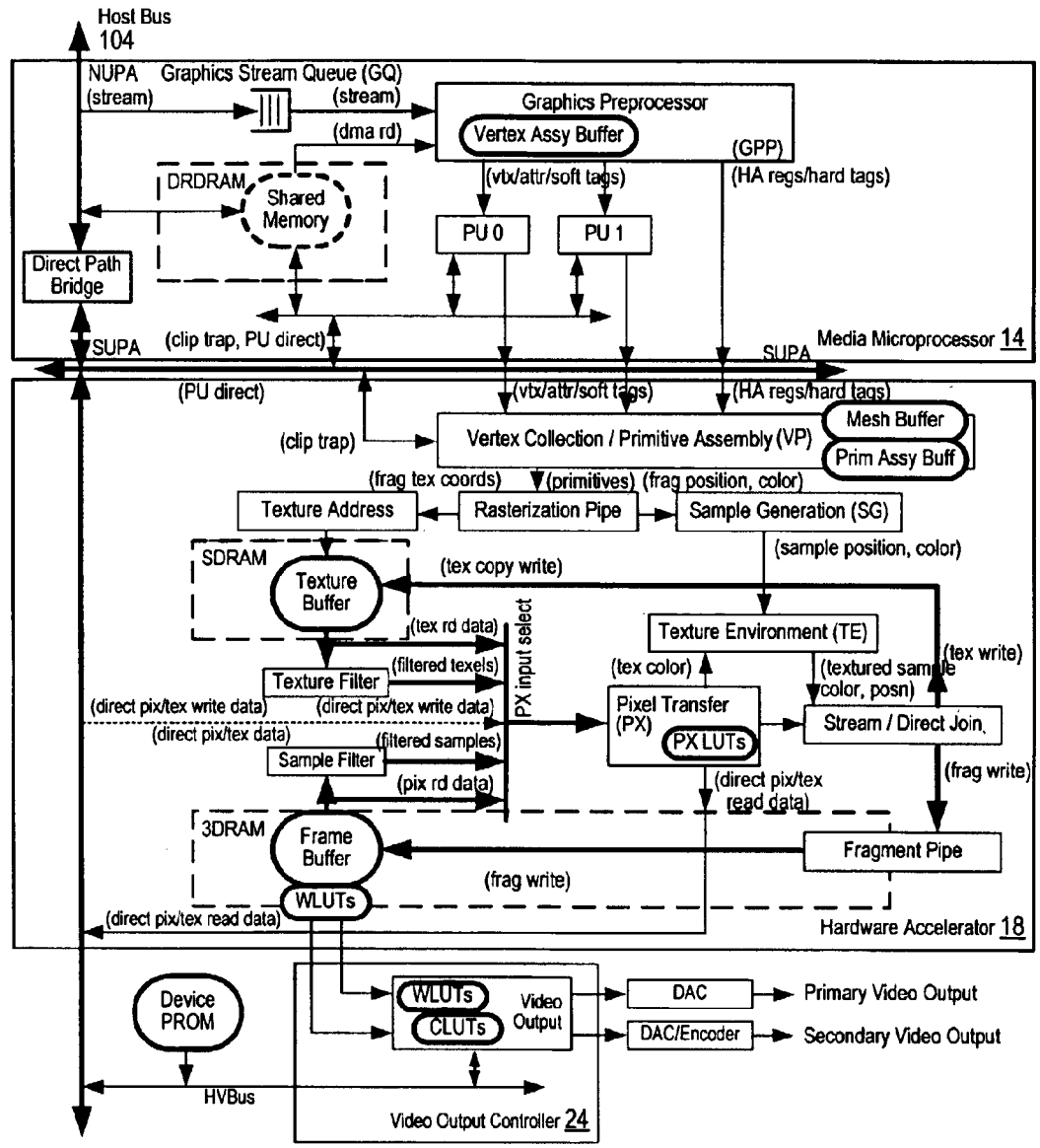
FIG. 2 illustrates another set of embodiments of the graphics rendering system.

FIG. 2 illustrates a high-level block diagram for the graphics rendering system according to one set of embodiments. The block diagram include a number of major processing blocks (denoted as rectangles), major memories, tables and data buffers (rounded) and paths (arrows).

The upper rectangular region minus its dotted subregion corresponds to the media processor 14. The middle rectangular region minus its two dotted subregions corresponds to the hardware accelerator 18. The lower rectangular region corresponds to the video output processor 24.

The dotted subregion of the upper region corresponds to the shared memory 16. The two dotted subregions of the middle region correspond to the texture buffer 20 and frame buffer 22 respectively.

The system bus 104 (e.g. a UPA64S bus) couples the host processor (or host system) to the host interface 11 of the media processor 14. (The system bus is also referred to herein as the host bus.) The controller 160 couples the media processor 14 and the hardware accelerator 18. A bus 32 couples the hardware accelerator to the device PROM 30 and the video output processor 24. Bus 32 is referred to herein as the Hvbus.

The graphics rendering system may include a number of memories such as the frame buffer, the texture buffer, the shared memory, and the device PROM 30.

The graphics rendering system has a number of features that allow for accelerated drawing of graphics into the frame buffer 22, and then, display of the frame buffer contents in one or more video output streams. In one embodiment, the frame buffer memory may be used to store up to 5.2 million data items (where a data item may be either a sample or a pixel); up to 2.6 million pixels may be displayed, and the balance of the data items may be used for offscreen pixel or sample buffers.

The device PROM may contain the bootstrap code for the media processor. The device PROM may also contain the system OpenBoot FCODE (device identification and initialization, console terminal emulator).

Processing Blocks in the Media Processor 14

FIGS. 1D and 2 provide exemplary embodiments of media processor 14. Media processor 14 includes a host interface 11. The host interface 11 may be a North UPA Interface (NUPA). The host interface is a slave that handles transactions between the host and the graphics rendering system. The host interface may contain status and control registers, interrupt logic, and data and address buffers. An address decoder may route data to the status and control registers, a graphics queue GQ, shared memory, or the direct path bridge.

The host may write "stream" commands into the graphics queue, where the commands are queued up for processing by the graphics rendering system. The host may poll the free word count in the front-end status register to avoid overflowing the graphics queue.

The stream commands may include a series of command strings, each composed of a header word followed by one or more data words. The graphics preprocessor (GPP) pulls strings out of the GQ and interprets them. Depending on the string type, the GPP may route the output in various ways:

(1) HA (hardware accelerator) register writes (including 2D vertices) may be passed to the hardware accelerator 18 without further processing
(2) GPP control register writes are absorbed by the GPP itself.
(3) Attributes and instructions to the media processor's microcode routine may be buffered up and passed to the processor units PU0 and PU1. The processor units may consume these and/or pass them on to the hardware accelerator 18.
(4) 3D vertex components may be format converted and assembled into complete vertices in the vertex assembly buffer. If vertex components are missing in a vertex, their values may be inherited from the previous vertex. Groups of vertices may be buffered up and dispatched to the next available processor unit. After transforming and lighting the vertices, the processor unit microcode routine sends the processed 3D vertices to the hardware accelerator 18.
(5) Compressed strings are decompressed into attributes, vertices, mesh buffer operations, and GPP control writes. Mesh buffer operations are shadowed in a GPP mesh buffer and passed on to the hardware accelerator; the others are processed as listed above.

The GPP may operate in a "hard tags" mode. In this mode, the GPP may send an ordering tag to the hardware accelerator 18 for each vertex or attribute that it sends to the processing unit(s). This is so that the hardware accelerator may collect the processed attributes and vertices arriving from the processor units, along with the HA register writes and mesh buffer operations that have bypassed the processors and place them all back in the correct stream order. (HA register writes are register writes targeting registers in the hardware accelerator.)

In certain special cases is may be desirable to route all transactions through the processor units. Thus, the GPP may have a "soft tags" mode to support such special cases.

The media processor 14 may include $N_{PU}$ processing units. In the illustrated embodiment, the media processor includes two processor units PU0 and PU1 (i.e. $N_{PU}$=2). The processing units are also referred to herein as MPUs. The microcode routines that execute on the processor units (PUs) perform a number of functions including, but not limited to, the following functions:

(a) Highly optimized per-vertex processing routines that transform and light batches of vertices. In one embodiment, a batch may include 2 or 4 vertices.
(b) Attribute processing routines that define and update the vertex processing pipeline microcode state and/or the hardware state of the hardware accelerator (HA) drawing pipeline (i.e. the drawing pipeline in the HA).
(c) In special cases that are not directly supported by the optimized vertex processing routines or by the HA hardware pipes, the microcode may perform its own primitive assembly, rasterization and/or texturing.
(d) System services microcode for initialization, trap handling, host driver communications, context switching and memory allocation.

The controller 160 (e.g. a South UPA interface) allows the media processor to be the master of the various blocks in the hardware accelerator 18. The GPP and the PUs may write to the vertex collection and primitive assembly blocks of the hardware accelerator. The PUs may also use the PU direct path to read and write frame buffer pixels, texture buffer texels, and various registers in the hardware accelerator and video output processor (including DP user, primitive assembly, clip trap handling, configuration and context switch registers).

In one embodiment, the direct path bridge is a bus bridge from NUPA to SUPA that allows the host bus to be a SUPA master to read and write FB pixels, TB texels, and various registers in the hardware accelerator and HVbus (including DP user, primitive assembly clip trap handling, configuration and context switch registers). The direct path bridge is also referred to herein as the bus interface unit (BIU) 154.

FB is an acronym for frame buffer.
TB is an acronym for texture buffer.
UPA is acronym for Universal Port Architecture.
NUPA is an acronym for North UPA.
SUPA is an acronym for South UPA
Universal Port Architecture (UPA) is a bus specification. There are 128 bit UPA ports ("UPA128") for CPUs that support masters and slaves, 64 bit ports for I/O chips that support masters and slaves ("UPA64M"), and 64 bit ports ("UPA64S") for slave only devices.

Processing Blocks of the Hardware Accelerator

In one set of embodiments, the hardware accelerator 18 includes the following processing blocks as variously illustrated in FIGS. 1B, 1C and 2.

Slave interface: Slave interface (e.g. a South UPA interface) responds to the SUPA master in the media processor. The slave interface may contain status and control registers, interrupt logic, pixel read-ahead logic, data and address buffers. The slave interface receives transactions from media processor. Each transaction includes an address and some data. An address decoder in the slave interface decodes the address (e.g. by using a lookup table) to determine where the transaction should be sent. For example, the address decoder may route the data to any of various HA registers, the vertex processor (VP), the direct path, the render/accelerated path, or the video output processor. The slave interface is also referred to herein as UBI (UPA bus interface).

Vertex processor (VP): Vertex collection and primitive assembly is performed in the vertex processor. The vertex processor collects ordering tags, HA register writes, attribute writes and processed 3D vertex components.

3D vertices may be pushed into a mesh buffer for later reuse. Based on the tag stream order, new and reused vertices are assembled into 3D primitives by the primitive assembly block and then clip tested. Primitives that pass the clip test are launched to the rasterization pipe. Primitives that fail the clip test may be tossed. Ambiguous cases cause a clip trap which is processed by the media processor's microcode.

In one embodiment, 2D vertices arrive as HA register writes and undergo a simplified primitive assembly, without any mesh buffer or clipping support.

Rasterization pipe (RP): The rasterization pipe accepts the launched primitives (lines, polygons, etc.) and decompresses them into pixel fragments. Fragment position, color, alpha, and depth are sent to the sample generator. Fragment texture coordinates are sent to the texture address block.

Sample generator (SG): When stochastically-sampled rasterization of 3D primitives is enabled, the SG determines which sample positions are inside the primitive, interpolates color, alpha, and depth at each interior sample position, sending the results to the texture environment unit (TE).

When filtering (e.g., Gaussian filtering) of 3D lines or dots is enabled, the SG determines a filter weight at each pixel (or sample position) inside the line or point coverage area, then multiplies alpha by the filter weight, and sends the pixel fragment color, alpha, depth and position to the texture environment unit.

When sampling and Gaussian filtering are disabled, or if the primitive is 2D, the SG may pass the rasterized pixel fragment color, alpha, depth and position to the texture environment unit without modification.

Texture address unit (TA): If texturing is enabled, the rasterization pipe sends fragment texture coordinates to the TA. The TA determines the texel sample addresses, the level of detail and blend factors required to look up and filter the texel samples within a specified filter footprint. The TA generates read requests to the texture buffer (TB) for each required texel sample. Note that the term "sample" is also used to describe the set of data values (e.g., rgbaz) computed by the sample generator SG at each sample position interior to a graphics primitive. Context will determine which usage is meant.

Texture filter (TF): The TF receives the texel sample data from the TB, along with the blend factors from the TA, and blends the texel samples together to produce a filtered texel.

Pixel transfer unit (PX): During texturing, the TF output is sent to the PX, which may perform a lookup function on the filtered texel color and alpha values. The PX is also used during direct path and copy operations.

Texture environment unit (TE): During texturing, the TE merges the PX output (texture color/alpha) with the SG output (fragment color/alpha) to obtain textured fragments. If texturing is disabled, the TE passes through the RP/SG fragment color, alpha, depth.

Texture pipe (TP): The TA, TB, TF, PX, TE cluster is referred to herein as the texture pipe.

Render pipe: The cluster of units defined by VP, RP, SG and TE is called the render pipe.

Stream path: The stream path starts at the GQ and GPP, may
pass through or around the PUs, passes through the VP and RP, and forks texture to the TP and pixels to the SG, rejoining them at the TE. The TE result is delivered to the stream/direct join pipe synchronization point.

Stream/direct join: The stream and direct paths fork at the host interface of the media processor 14 (i.e. stream goes to GQ, direct goes to the direct path bridge). The stream/direct join point is where the stream and direct paths rejoin, and where the shared path begins.

Shared path: The fragment pipe and writes to the frame buffer are shared by the stream and direct paths. At any given time, one of stream or direct paths may own the shared path.

Fragment pipe (FP): The FP implements per-fragment write operations such as:
constant substitution;
area patterning;
address, color and alpha clipping;
window ID (WID), stencil and depth tests;
plane group enabling and bit plane masks;
fog, blending and RasterOps.

In one embodiment, the FP is partly in the hardware accelerator 18 and partly in the frame buffer 22.

Copy/Filter Operations: The stream commands include a variety of copy/filter operations, in which the rasterization pipe becomes a memory address generator that moves data between or within the TB and the FB:

(A) Block copy operations move pixels or texels between or within the TB and FB, with optional pixel transfer (PX) operations (e.g. scale, bias, color matrix, lookup, histogram, min/max).

(B) Image filtering operations use the texture filter (TF) to perform convolutions upon TB pixel data (i.e. pixel data stored in the texture buffer). The convolution result may be subjected to the optional PX operations (mentioned above) and then sent to either the TB or FB.

(C) The render pipe may render stochastically-sampled scenes to an offscreen sample buffer in the FB. After the scene has been rendered, a stochastic sample filter (SSF) may be used to perform convolutions on samples from FB sample buffer, producing an antialiased scene in the display area of the FB. The SSF output may be gamma corrected by the PX.

(D) Accumulation buffer operations use a region of the TB as an accumulation buffer, supporting the OpenGL load, accumulate, multiply, add, and return operations, as well as a high precision slice blend operation for volume rendering. A chunk of memory in the TB may be allocated as an accumulation buffer (e.g., an RGB16 buffer).

Direct pixel/texel write path: The direct write path starts at the host interface and the direct path bridge to the controller (SUPA). Write addresses and data are sent through the PX input selector (also referred to herein as the pixel transfer multiplexor) to the PX unit, which may be assigned to perform pixel transfer (PX) operations on the write data. The PX result is sent to the stream/direct join point, and then to either the TB or the FB (via the shared path fragment pipe).

Direct pixel/texel read path. The direct read path starts at the host interface and the direct path bridge to the controller. Read addresses pass through the PX to the stream/direct join point, and then either to the TB or the FB. The memory read data returns through the PX input selector to the PX unit, which may be assigned to perform pixel transfer (PX) operations on the read data before returning the result to the host (via the controller 160 and the host interface 11).

Processing Blocks in or Relating to the Video Output Processor 24

HVBus Interface (HBI): The HBI allows the SUPA bus (and by extension, either of the MPUs or the host computer) to read the device PROM or to indirectly read/write the registers and tables of the video output processor (VOP).

Window lookup tables (WLUTs): The WLUTs define the visual display attributes for each window; they are indexed by the Window ID planes. WLUT entries may specify the following visual display attributes:

RGB vs. indexed color;

indexed color source (R, G, B, overlay);

color lookup table number, gamma correction, or bypass;

no overlay, opaque overlay, or transparent overlay.

The WLUTs may be physically split, residing partly in the hardware accelerator 18, partly in the frame buffer 22 and partly in the video output processor 24. There is also overlay logic in the frame buffer, which determines whether the primary or the overlay planes will be displayed.

Color lookup tables (CLUTs): In one embodiment, four CLUTs are available to store pseudocolor or direct color maps, with 256 triple entries per CLUT. For true color windows, the single Gamma LUT (GLUT) may be used instead (1024 triple entries). It is also possible to bypass the GLUT.

Additional video output functions may include a hardware cursor and dual video timing generators, which may generate timing and data requests for a primary and secondary video output stream.

Video digital-to-analog converters (DACs) or encoders: The primary video output stream may drive a video DAC (e.g., a video DAC which receives 10 bits each of red, green and blue) to an analog computer display. The secondary video stream may drive:

(1) An on-board TV encoder to an S-Video TV monitor or recording device, or (2) A feature expansion connector. Possible daughter card options include:

a second analog computer display, a digital flat panel link, or a serial digital video output link.

2.0 Render, then Filter Multisampling

In one set of embodiments, the graphics rendering system defers sample filtering until after the rendering for a full scene is complete.

The graphics rendering system may defer sample filtering till just before the display buffer swap. The entire scene is filtered at the animation rate (which depends on scene complexity).

The graphics rendering system performs the following series of steps:

(a) render a scene into the sample buffer (allocated in the FB);

(b) filter the scene from sample buffer to the back display buffer (also allocated within the FB) at animation rate;

(c) swap front and back display buffers (at animation rate);

(d) for each display refresh, display pixels in the display buffer (at video rate, often greater than animation rate).

2.1 Frame Buffer (FB) Allocation 2.1.1 FB Bit Plane Usage

In one embodiment of the frame buffer 22, each pixel (or sample) may have 116 bit planes of data. FIG. 3 illustrates one way of organizing the 116 bit planes. FIG. 4 is a table describing various fields making up a pixel (or sample).

When rendering to the sample buffer, the hardware accelerator 18 may write R, G, B, A into Buffer A and also S and Z. S and Z may be needed for stencil and hidden surface removal operations, which determine which samples are visible in the final scene. Alpha (A) may be used for compositing and transparency, which can affect the RGB color values in the final scene.

When filtering, the hardware accelerator 18 may read R, G, B from the sample buffer and write the filtered result (via the PX unit and fragment pipe) to the R, G, B planes of the display buffer (Buffer A or Buffer B, whichever is currently the "back" buffer during double-buffered rendering). The window system may maintain the W and overlay planes separately from the filtering process; the Wp planes may be set to cause RGB true color display.

During display, the Wp planes may select RGB true color display from the "front" display buffer.

2.1.2 FB Memory Allocation

The following discussion will assume that the frame buffer 22 has 16 DRAM memory devices organized in four ranks. However, it is noted that the number of DRAM memory devices in the frame buffer may take any of a variety of values, and likewise, the number of ranks in the frame buffer may take any of a variety of values.

A single DRAM memory device may contain storage for 640×512 data items. (A data item may have 116 bits as suggested by FIG. 3). Thus, the frame buffer may store up to 16×640×512=5120K data items. Each data item may represent a pixel or a sample. In one set of embodiments, half the DRAM memory devices are coupled to the video output processor, and the remaining half of the DRAM memory devices are not so coupled. In these embodiments, the frame buffer may store up to 2560K display pixels (i.e. onscreen memory pixels).

The basic unit for allocating frame buffer memory is called a "page". In one embodiment, a page may contain 5120 data items. Thus, the frame buffer page capacity may equal 5120K/5120=1024 pages. The first 512 pages are displayable.

The graphics rendering system may support up to $N_{dr}$ displayable regions, where $N_{dr}$ is a positive integer. In one embodiment, the graphics rendering system may support up to two displayable regions and an unlimited number of off-screen regions.

For example, the console may be the first displayable region. The first displayable region may be allocated starting at page 0 of the FB memory as suggested by FIG. 5. Thus, if the first displayable region is allocated $D_1$ pages, the first displayable region may occupy pages pages 0 though $D_1-1$.

If there were a second displayable region, it may be allocated just above the console. In the example, if $D_2$ pages are allocated to the second displayable region, the second displayable region may occupy pages $D_1$ though $D_1+D_2-1$, where $D_1+D_2<=512$ pages. The symbol "<=" denotes "less than or equal to".

If supersampling is requested, an offscreen supersampled region may be allocated at the top of the FB memory (from page 1023 downwards). In the example, if $S_1$ pages are allocated, the offscreen supersampled region may occupy pages $1024-S_1$ though 1023, where $S_1+D_1+D_2<=1024$.

If additional offscreen memory were allocated, it may go below the first supersampled region.

For a given frame buffer storage mode (set by the FB_*_ MODE registers), each allocation page has a fixed height and width in pixels. The table of FIG. 6 lists the page sizes for the various FB_MODE options according to one embodiment of the graphics rendering system. When the sample density is not a power of two, the allocation page width times height is less than the page capacity of 5120 data items in part because a non-power-of-two does not divide a power of two evenly.

Frame buffer regions are rectangular areas. The region width corresponds to an integer multiple of the allocation page width. The region height corresponds to an integer multiple of the allocation page height. If an odd-sized region is desired (either region width being a non-integer multiple of page width or region height being a non-integer multiple of page height), the next larger integer multiple width and integer multiple height may be allocated.

widthPages=roundup(widthPixels/pageWidth)

heightPages=roundup(heightPixels/pageHeight)

The total allocated area (in pages) is simply the product of the region width and height (both rounded up to integer pages).

areaPages=widthPages*heightPages

For example, to allocate a FB memory region for an 1152×900 non-stereo display, note that the pagewidth is 320 and the pageHeight is 16. The following computations indicate that the 1152×900 display region may be covered by a frame buffer region having 228 pages.

widthPages=4 pages wide=roundup(1152/320)

heightPages=57 pages high=roundup(900/16)

areaPages=228 pages=4*57

Suppose a graphics window has 700×700 pixels, and an offscreen supersample buffer is to be allocated for the window at a sample density of four (i.e. four samples generated per unit pixel area). For sample density four, the pagewidth is 80 and the pageheight is 16. The following computations indicate that the supersample buffer may be allocated 396 pages of the frame buffer.

widthPages=9 pages wide=roundup(700/80)

heightPages=44 pages high=roundup(700/16)

areaPages=396 pages=9*44

Library functions may assert a memory allocation request to allocate a FB region, specifying the FB_MODE, along with the desired height and width in pixels. A software driver may perform the above calculations and allocate the number of pages needed to store the desired area in the desired FB_MODE, returning failure/success status and values for FB_BASE (the first allocated page) and FB_STRIDE (the width of the allocated area, in pages). The driver may also keep its own record of the allocated area, for use during subsequent requests.

Also there may be library functions to query for the amount of remaining unallocated memory and another query to ascertain how much memory would be allocated if a specified mode, height and width were requested.

Suppose a (double-buffered) pixel display buffer for a display having $W_d$ by $H_d$ pixels is to be allocated. To support this display, the driver may allocate an integer number of FB memory pages given by ceiling (Wd/pageWidth)*ceiling (Hd/pageHeight), where pageWidth and pageHeight are the width and height respectively of a FB memory page. The values of pageWidth and pageHeight vary depending on the FB memory allocation mode. The mode may indicate whether the buffer to be allocated is to serve as a display buffer or offscreen buffer. The mode may further indicate whether a display buffer is to be configured for stereo or non-stereo, or whether an offscreen buffer is to be used for pixels or samples. In the later case, the mode may indicate the sample density, i.e. the number of samples per pixel.

In a window system, the graphics rendering system may render to a window that is less than full screen in size. Suppose that a window has size $W_w$ by $H_w$ pixels, the sample filter (SF) has a footprint of $W_f$ by $H_f$ pixels, and the sample density is $D_s$. In this case, the driver may allocate an integer number of FB memory pages given by the expression Ceiling{($W_w$+$W_f$)/pageWidth}*Ceiling{($H_w$+$H_f$)/pageHeight} for an offscreen sample buffer corresponding to the window.

Note that the offscreen sample buffer includes a border around the $W_w$×$H_w$ window to accomodate the 'skirts' of the sample filter footprint. In the special case of an unmagnified box filter with a footprint that is exactly the displayed pixel, Wf and Hf are zero (since there are no contributions from outside the pixel) and the extra border allocation is not needed.

The finite FB capacity is shared between display buffers and sample buffers. Thus, the maximum sample density is roughly equal to Floor{(FB size in data items minus display size in pixels) divided by (window size in pixels)}, where Floor{x} is the integer floor function. This implies that lower resolution displays and/or smaller sized windows can support higher sample densities in a fixed-size sample buffer.

EXAMPLES

For a single-headed 1280×1024 non-stereo display, the display buffer uses (ceil(1280/320)*ceil(1024/16))=256 pages of FB memory. That leaves (1024−256)=768 pages for a sample buffer at 5120 samples per page.

A 1000×1000 pixel window can support a sample density of 3 since ceil(1000/80)*ceil(1000/20)=650 pages which is less than 768 pages.

A 720×670 pixel window can support a sample density of 8 since ceil(720/40)*ceil(670/16)=756 pages which is less than 768 pages.

For a single-headed 960×680 stereo display, the display buffer uses (ceil(960/320)*ceil(680/8))=255 pages of FB memory. That leaves (1024−255)=769 pages for a sample buffer. Thus, the same window sizes as in the first example can be supported.

For a single-headed 640×480 stereo VGA display, the display buffer uses (ceil(640/320)*ceil(480/8))=120 pages of FB memory. That leaves (1024−120)=904 pages for a sample buffer. A nearly full-screen window (600×480) supports a sample density of 16 since ceil(600/40)*ceil(480/8)=900 pages which is less than 904 pages.

2.2 Render, Filter Phases

To render a scene frame using multisampling, the graphics rendering system performs a sequence of steps. This sequence of steps is repeated over and over during scene animations. The following description assumes that a window-sized (plus filter footprint) sample render buffer and a screen-sized pixel display buffer have been pre-allocated in the FB memory.

2.2.1 Clear Sample Render Buffer

Before rendering, samples in the (window-sized) sample buffer are "cleared" to the background RGB color with depth equal to infinity and stencil planes reset. The fast fill function accelerates this step. In one embodiment, the fast fill function may operate at approximately 5.3 Billion samples/sec.

Figure 7:
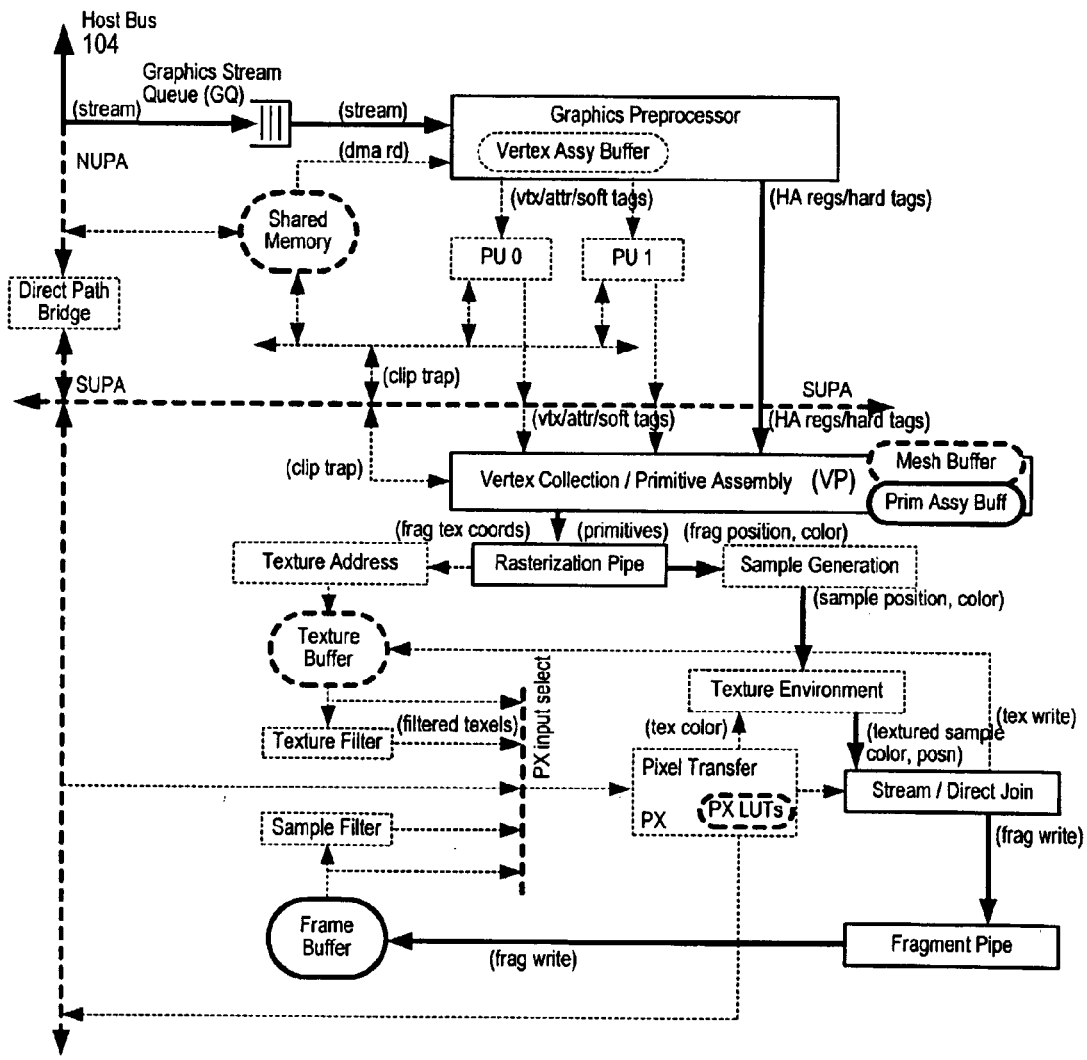
FIG. 7 illustrates one embodiment of a fast fill function to clear an area of the sample buffer.

FIG. 7 represents this flow. The rasterization pipe generates the sample block addresses of the window area and the fragment pipe fills the sample blocks in the FB memory. Paths that are not active in the clear operation are denoted in dotted lines.

2.2.2 Render Multisamples to Sample Buffer

Figure 8:
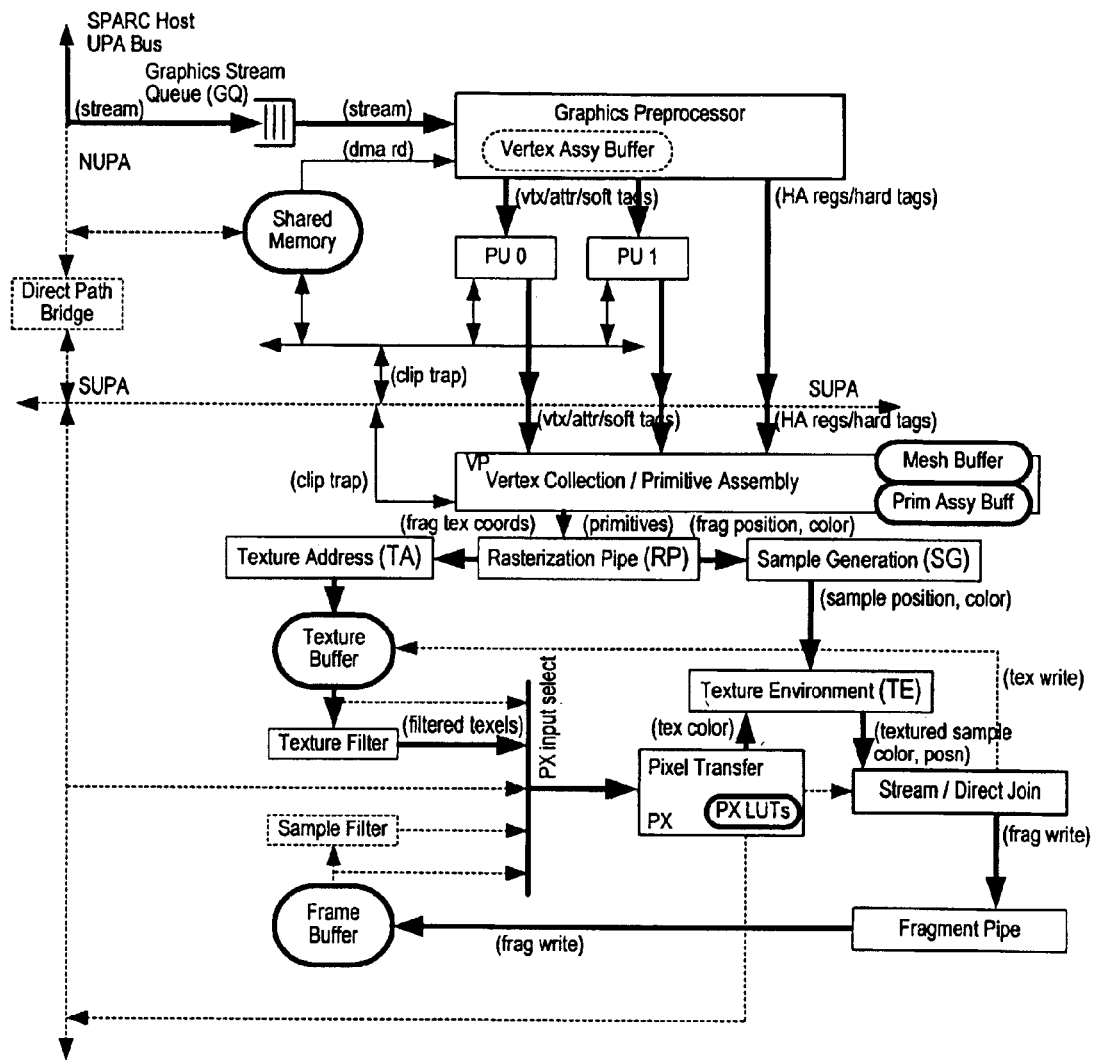
FIG. 8 illustrates one embodiment of a process for rendering multisamples (i.e., supersamples) to the sample buffer.
Figure 9:
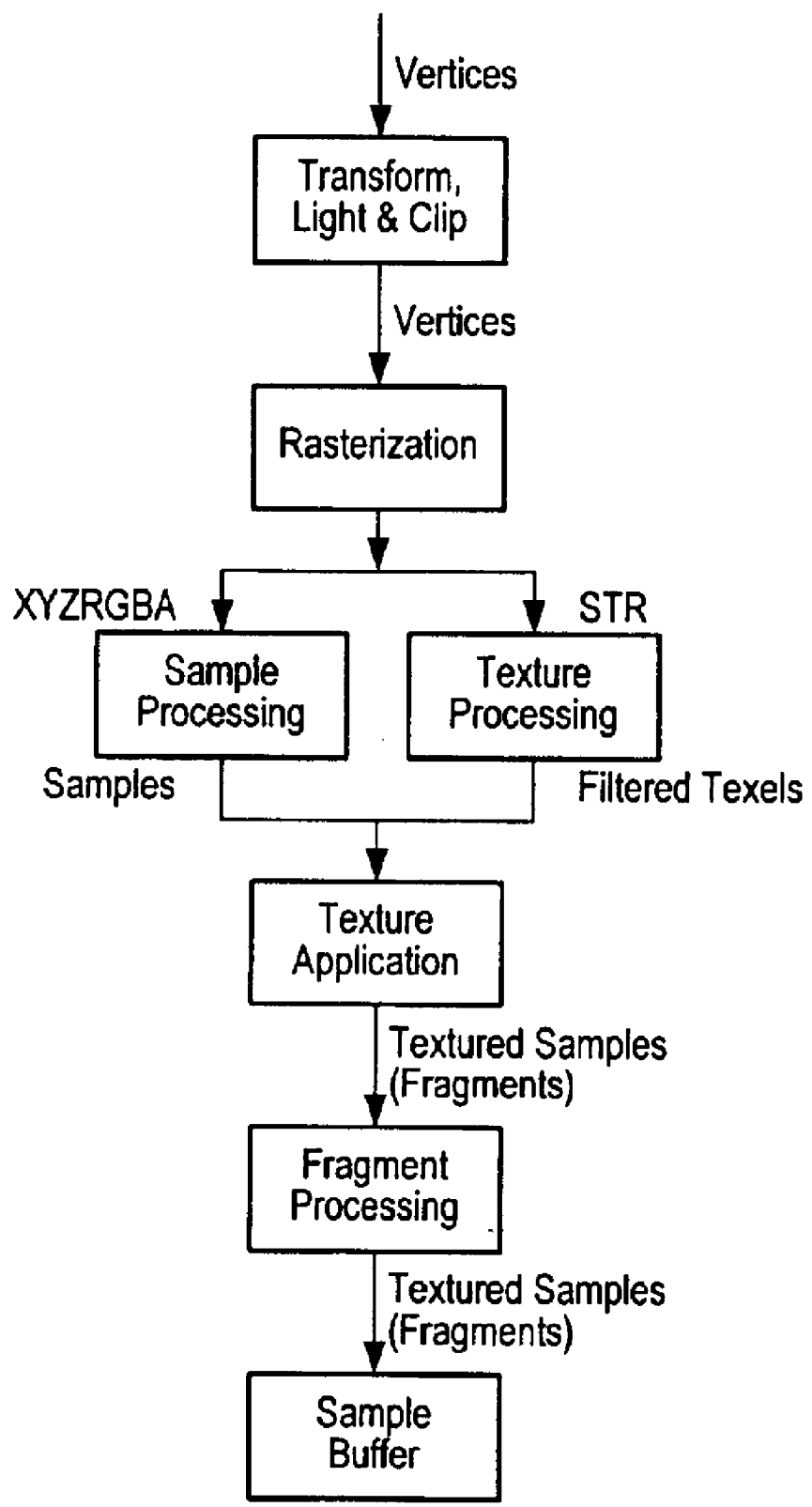
FIG. 9 illustrates the parallelism of sample processing and texture processing resources in one set of embodiments of the graphics rendering pipeline.

Next, the vertex (and attribute) data that define the scene is sent through the 3-D stream rendering path with multisampled rendering enabled, targeting the sample buffer allocated in the FB, as indicated by FIGS. 8 and 9.

The media processor 14 (i.e. graphics preprocessor and processor units) may perform transform, lighting and clip code generation functions on each vertex in the scene. These functions may be performed in a manner consistent with the OpenGL standard or some other standard.

The vertices may be assembled into primitives (typically triangles) per the OpenGL standard. Primitives which pass the clip test and face-culling test are rasterized. This work may be performed by the vertex processor and the rasterization pipeline. (Recall that the rasterization pipeline RP includes the presetup unit PSU, the setup unit SU, the edge walker EW and the span walker SW units as suggested by FIG. 1C).

The rasterization pipeline RP produces pixels with position (x,y) and texture coordinates (s,t,r), as well as depth (z) and color (r,g,b,a) values.

The texture processing path includes the texture address unit TA and texture filter TF units. Based on the single texture coordinate vector (s,t,r), the texture processing path reads up to $N_{tms}$ texel samples (e.g. $N_{tms}=8$) from the texture memory 20 and filters these texel samples to determine the per pixel texture color at (s,t,r). In some implementations, the texture processing path may accept multiple texture coordinates and produce multiple texture results per pixel ("multitexture").

The sample generator SG determines the subpixel location of each sample in the pixel and determines which samples are inside the primitive. The sample evaluator SE produces a sample mask and per sample values for (r,g,b,a,z).

The sample processing and texture processing pipelines operate asynchronously and, in general, produce differing amounts of data per pixel. They include queues which allow either pipeline to run somewhat ahead or behind the other pipeline.

For each pixel, the texture environment unit TE applies the (per pixel) texture color from the texture pipeline to all of the samples generated for that pixel. The final textured pixel color may be applied using the OpenGL texture environment function(s), or in the case of multitexture, the OpenGL multitexture extensions. Thus, the texture environment produces multiple textured samples from each pixel (also called fragment samples).

(Each of the DRAM memory devices forming the frame buffer may include one or more pixel processors, referred to herein as memory-integrated pixel processors. The 3DRAM memory devices manufactured by Mitsubishi have such memory-integrated pixel processors.)

The fragments (textured samples) are processed by the fragment pipe and the memory-integrated pixel processor and are written to the pre-allocated sample buffer area in the frame buffer memory. The memory integrated pixel processor may apply the standard OpenGL fragment processing operations (e.g., blending, stenciling, Z buffering, etc.).

In general, within the same scene frame, more than one primitive may contribute sample values to the same sample location. For many such samples (i.e., the nontransparent samples), the Z buffer operation will select the sample value from the "winning" primitive (usually the nearest to the viewer). This hidden surface removal process may cause some of the samples rendered earlier in the scene to be replaced by samples rendered later in the scene. The term "depth complexity" is used to refer to the average number of attempts to update each sample per scene. A cluttered scene with many objects in front of each other, as seen from the eye point, will have a higher depth complexity.

2.2.3 Filter Sample Buffer to Back Display Buffer

For each frame time, once the scene has been completely rendered into the sample buffer, the final "winning values" for each sample remain. At this point, the sample filter SF is applied to samples from the sample buffer to obtain an array of filtered pixels, which are routed via the pixel transfer unit PX and the fragment pipeline FP to the pixel display buffer area in the frame buffer 22, reusing the pixel copy-address generation hardware in the span walker unit SW and the pixel copy data paths.

Figure 10:
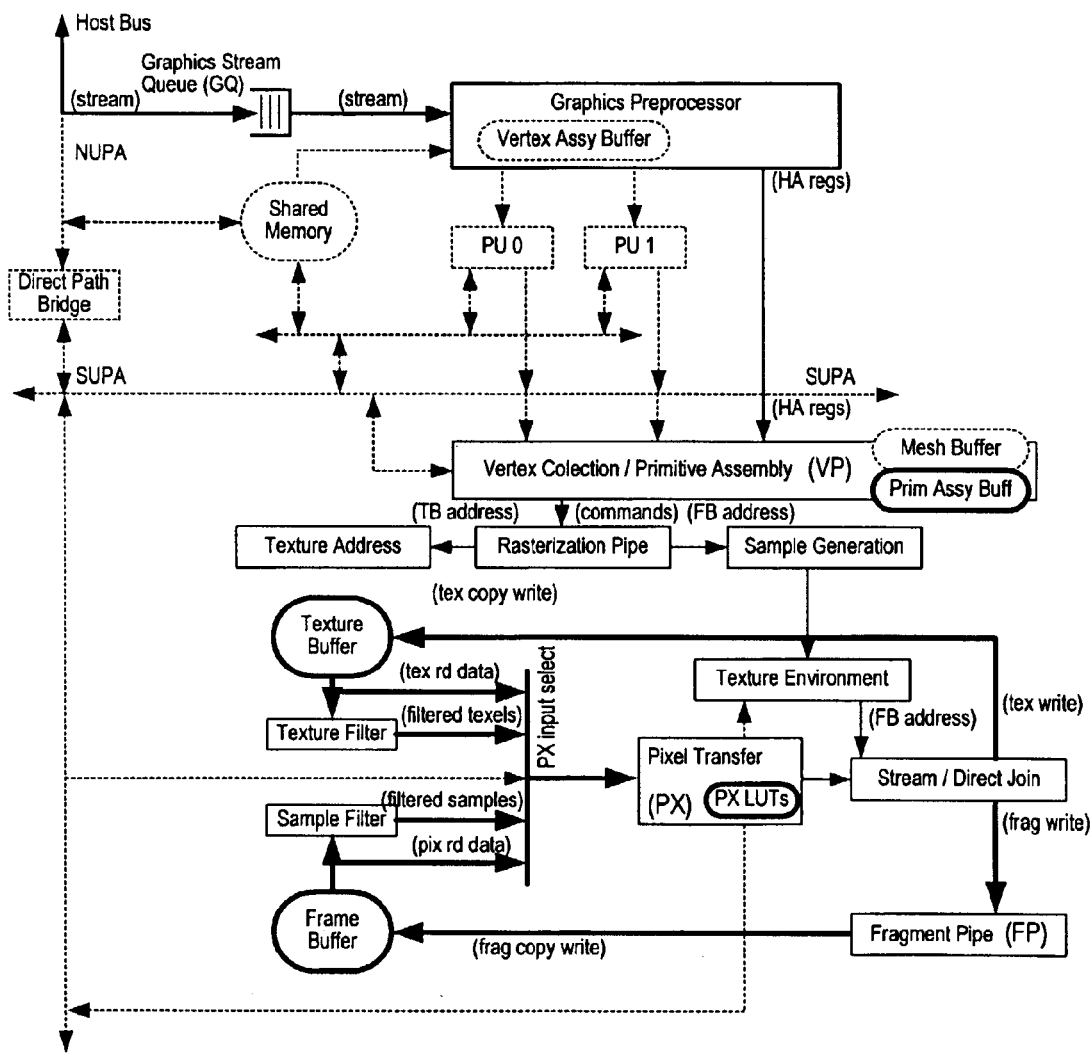
FIG. 10 illustrates copy pathways that are used in a set of copy operations.

The copy, filter and accumulate operations are a special group of stream commands, in which the rasterization pipe RP becomes a memory address generator that induces the transfer of data between or within the TB and the FB. The copy paths are highlighted in FIG. 10. The operations may be set up by a series of BRS register writes to set up FP, PX, copy, filter or accumulate attributes, followed by BRS writes to the VP which define the copy area "vertices" (upper left corner of source and destination, common height and width). In one embodiment, the copy area width is written last, and triggers the copy operation. The rasterization pipe becomes an address generator and induces the transfer of the pixel/texel data for the entire area. When the copy is done, the RP may revert to normal processing.

Figure 11:
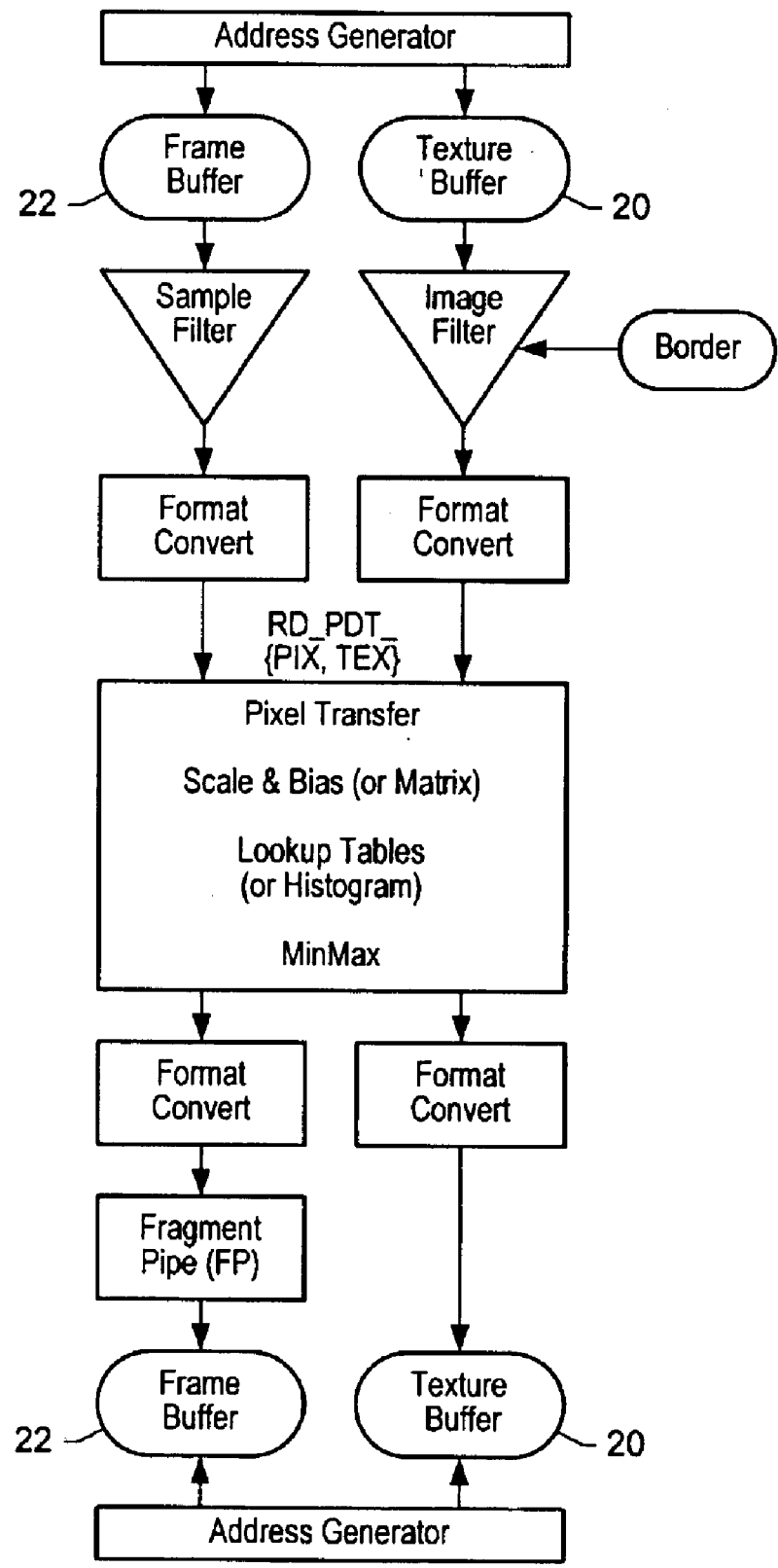
FIG. 11 illustrates the flow of data for a set of copy, filter and accumulation operations.

FIG. 11 illustrates the flow of data for copy, filter and accumulation operations. The address generator is shown as two separate boxes in the Figure for simplicity of the diagram. The two boxes are to be identified. The texture buffer 20 and frame buffer 22 have likewise been duplicated for the sake of diagrammatical simplicity. The term image filter is another name for texture filter TF.

Copy and Sample Filter Operations

Block copy operations move a rectangular area of pixels/texels from a source area in a source buffer to a destination area in a destination buffer. There are four kinds of simple block copy operations:

Frame Buffer to Frame Buffer
Frame Buffer to Texture Buffer
Texture Buffer to Texture Buffer
Texture Buffer to Frame Buffer FIG. 12 describes the address generation for pixel copy (i.e. for a FB-to-FB block copy operation). The source is in the frame buffer if the stream path RD_PDT register is set to RD_PDT_PIX, and in the texture buffer if RD_PDT_TEX. The destination is in the frame buffer if the stream path WR_PDT register is set to WR_PDT_PIX, and in the texture buffer if WR_PDT_TEX. The pixel transfer block functionality is available during any block copy operation.

Block Copy Addressing. The upper left corner of the source and destination areas are defined by the COPY_{X,Y} and RECT_{X,Y} registers. RECT_{H,W} defines the (common) size of the source and destination areas. All of these values have no alignment restrictions; the areas can be positioned and sized with a resolution of one pixel. The source and destination areas lie within the allocated source and destination memory buffers, respectively. When the source or destination is the frame buffer, the memory buffer origin is at FB_{RD,WR}_BASE.

In one set of embodiments, a host routine may reprogram the destination area for each pass in a multi-pass procedure for rendering each animation frame.

Supersample Filter (SSF). A special filter is provided for filtering stochastically-sampled scenes which have been rendered into supersample buffer areas of the frame buffer. This operation is a specialized "frame buffer to frame buffer copy" with filter from the offscreen supersampled rendering source to an onscreen pixel display destination.

Figure 14:
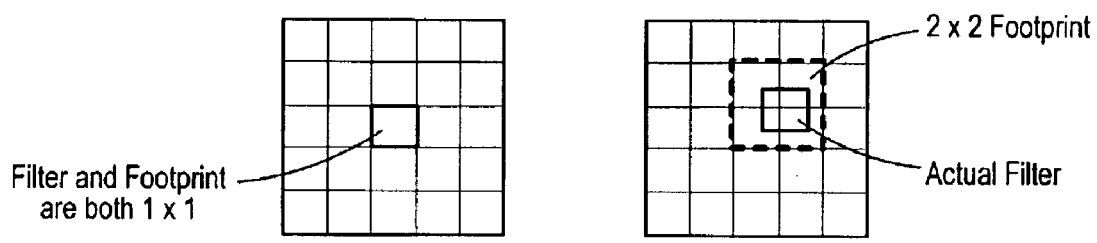
FIG. 14 illustrates exemplary footprints for sample filtering with a filter having a 1×1 square support region.
Figure 15:
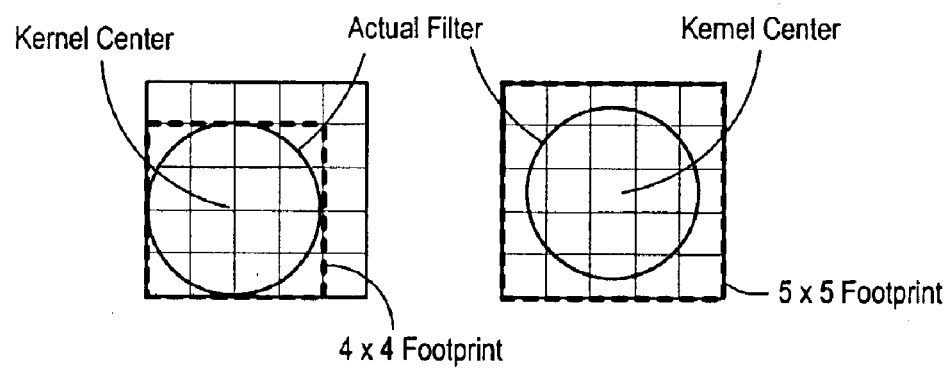
FIG. 15 illustrates exemplary footprints for sample filtering with a filter having disk shape support region with radius R=2.

FIGS. 13–15 describe the address generation and footprints for sample filtering.

Supersample Filter Addressing. The source and destination areas are again defined by COPY_{X,Y}, RECT_{X,Y} and RECT_{H,W}. The source is in a supersampled region of the frame buffer and the destination resides in a pixel region of the frame buffer.

A filter "kernel" region (e.g., in one embodiment, a disk shaped region with radius of up to 2 pixels in source space, centered on the source address that corresponds to each destination address) is read instead of a single source point. When the source address is at or very near the edge of the source area, part of the kernel may fall outside the source area (see sample "s" in FIG. 13). The source of the part of the kernel that falls outside the source area is determined by SSF_MODE_BORDER.

Supersample Filter Programming Model. The supersample filtering includes computing weighted sum of the colors (rgba) of all of the samples that fall within the filter support region, centered at a location in the source space (also called bin space), corresponding to a pixel in the destination space. (Note that the pixels in the source space are also referred to as bins.)

For each output pixel, the hardware computes the kernel center (i.e. the center of the filter support) in the source space. However, the location of the first (or top left most) kernel center is set by the software at RECT_{X,Y}. It can be optionally offset by (0.5, 0.5) by using SSF_MODE_OFFSET_ENABLE ("Supersample Filter Mode Offset Enable Register"). Subsequent coordinates for the kernel centers are, incrementally computed by the hardware accelerator, using the SSF_STEP_SIZE register ("Supersample Filter Step Size Register"). This may be the step_size, along both the X and Y directions.

Magnification Ratio. The destination area can be equal or larger than the source area. The ratio of destination width to the source width is called the Magnification Ratio. It may be specified indirectly by selecting a value for SSF_STEP_SIZE, so that magnification ratio is 1.0/SSF_STEP_SIZE.

Filter Types. In one embodiment, the filter function employed by the supersample filter may be either a box filter or a circular circular filter. This selection is specified in the SSF_MODE register. The filter radius may be specified in the register referred to herein as SSF_FILTER_RADIUS.

Box Filter. The box filter is a square filter. The linear dimension is double the filter radius, SSF_FILTER_RADIUS. Each sample is given the same (maximum) weight. This filter averages the colors of the sample points that are covered by the kernel.

FIG. 14 introduces the concept of the SSF read "footprint" (i.e. the set of bins that contribute samples to one filtered pixel) for a box filter. Two examples are shown in the figure, each with radius 0.5.

If the offset is (0.5, 0.5) and the step size is 1.0 (no magnification), then the footprint in the source space is 1×for the first pixel (due to the offset), as well as for all other pixels (due to the step size). This is illustrated on the left side of FIG. 14.

If, however, magnification ratio is greater than 1.0 or the offset is not (0.5, 0.5), the footprint will, in general, be 2×2, as indicated in the right side of FIG. 14. The right hand case may run more slowly than the left hand case.

Circular Filter. As the name implies, the kernel for this filter is circular in the source space. Two examples, each with radius=2.0 are illustrated in the FIG. 15. The example on the left corresponds to the case when the current kernel center is at the left corner of a bin. This corresponds to the case, when the offset is (0.0,0.0), and the magnification ratio is 1.0.

The example on the right of FIG. 15 corresponds to the case when the current kernel center is not at the left corner of a bin. This corresponds to the case, when the magnification ratio is not 1.0, even though the initial offset may be (0.0, 0.0). All the samples within the kernel circle (i.e. disk) contribute to the weighted sum. The locations of the samples within a tile (e.g., a 2×2 tile of bins) are specified in a supersample jitter table referred to herein as SSF_JITTER_TABLE. These jitter values may be permuted, if necessary (details to be provided later in this section), to arrive at the final sample locations. The filter weight at each sample location depends upon its radial distance from the kernel center.

The filter weights describe a function of the radial distance, r. In one set of embodiments, the filter weights are provided in a table of 128 values; each weight being of the format s.10 with range (−1.0, 1.0). The table may be indexed by $(nr)^2$. It is designed to be hardware friendly, to have high access speed and low gate count. Here nr is simply the normalized radial distance, r/R, where R is the kernel radius.

Sample density, i.e., the number of samples per bin.

Permutation Control. If enabled, the samples in the source space tiles (a tile is a 2×2 square of bins) are permuted, so that they appear to be replicated only at the 128×128 bin boundaries; otherwise, the samples are replicated at every 2×2 bins.

Permutation Code (range [0,7]) for temporal anti-aliasing. This allows different permutation of tiles in each frame, depending upon the permutation code, to allow up to eight different patterns in each frame.

The actual samples to be used may be selected in the SSF_SAMPLE_MASK.

More Description of Copy Operations

Copy operations move a rectangular array of pixels from either the FB or the TB to either the FB or the TB. They involve two 2-D addresses (i.e. source and destination). Software preclips the source and destination rectangles.

Source data may be any of:
Pixels from the frame buffer memory (FB)
    Pixels from the on-screen (visible) frame buffer
    Pixels from an off-screen pixel buffer
Samples from the frame buffer memory (FB)
    Samples from an off-screen supersample buffer
Pixels or texels from the texture buffer memory (TB)
    Texels from a texture map
    Pixels from an image buffer
Data can be copied to any of the following:
Pixels to the frame buffer memory (FB)
    Pixels to the on-screen (visible) frame buffer
    Pixels to an off-screen pixel buffer
Pixels to the texture buffer memory (TB)
    Pixels to a texture map
    Pixels to an image buffer The following is a legend for a number of acronyms used in the following discussion:

FWQ=frame buffer write queue
FRQ frame buffer read queue
TWQ=texture buffer write queue
TRQ=texture buffer read queue
TRB=texture-buffer read buffer The Span Walker unit (SW) generates the two addresses. The SW unit sends the TB address to the TA block, which feeds the TBM and TBI (texture buffer interface). The SW sends the FB address through SG, SE, FDP to TE which feeds the FP and FBI. The source addresses may be generated ahead (e.g. about 40–60 clocks ahead in one embodiment) of the destination addresses, to allow enough prefetching to cover the FB or TB read latency.

The source data is read from either the FRB block or the TRB block to the PXM, which feeds the pixel transfer unit (PX). The PX unit can reformat, scale, bias and/or lookup (i.e. perform table lookup on) the data. The PX result data is sent to the TE or the TBM (for FB or TB copy destinations, respectively). The TE or TBM is the "join" point where the PX read data (specified by the SW read address) is matched up with the SW write address. If write data arrives (from the PX) before the write address arrives (from the SW or TA), or vice versa, the TE/TBM will stall the PX or SW, whichever is earlier, until the later unit is ready. Several special cases exist:

Copies between similar buffers (TB to TB, or FB to FB) may have overlapping source and destination areas. Thus, the address scan pattern is capable of operation in both ascending and descending order, to avoid overwriting the source before the copy occurs.

If the frame buffer (FB) 22 is the destination, fragment processing may be performed on the way into the frame buffer.

In some embodiments, when the frame buffer is the source, one can request that the source area be cleared as it is read out. This effectively performs a Fast Fill operation on the source area as it is being read out, in parallel with the copy operation.

In one set of embodiments, copies between dissimilar buffers (TB to FB, or FB to TB) may occur at one pixel per GCK, and are pipelined. The SW may specify FB addresses via the x, y fields (for full tile) and specifies TB addresses via the u, v outputs from the TA unit.

For copies between similar buffers (TB to TB, or FB to FB), the SW generates bursts of reads alternating with bursts of writes, because the TB and FB each have single address busses. The burst size may be determined by the FB and TB read pipeline latencies (estimated to be approximately 30–40 GCKs in one set of embodiments), and may be a significant fraction of the FB and TB pipeline depths (pipe stages plus FWQ/FRQ or TWQ/TRQ depths). Larger bursts reduce the overhead of turning around the memory data bus direction, and help to hide memory refresh bubbles and control latency. However, deadlocks may occur if the burst size exceeds the depth of the memory read pipeline.

In one set of embodiments, convolutions and copies of 8, 16 or 32 bit pixel formats can support up to four components (R, G, B, A) in one "Copy TB to TB" command or one "Copy TB to FB" command. Convolutions and copies of larger pixel formats may require multiple copies. For example, the components of a 64 bit pixel format may be transferred with two separate copy commands.

Image transforms may be accomplished by texture mapping an image onto a rectangle (Interpolated RECTANGLE command) or onto a TRIANGLE strip, instead of with a copy operation. Hardware accelerator 18 may support TB to FB image transforms.

Copy for stereo mode from FB to FB may be done in two flavors—copy one eye only (left or right) or copy both eyes.

Copy in supersample mode when selected sample per pixel is copied in one loop.

Copy Formats and Destination.

The copy source, destination and formats are defined in the RP_{RD,WR,RW}_PDT registers and in the RP_{RD,WR,RW}_TIF registers. The _TEX field in the RP_RD_PDT register defines the source of the data to be copied while _TEX field in the RP_WR_PDT register defines the destination.

SW uses the source and destination specified by the registers to properly direct source and destination addresses.

PX uses the source and destination specified by the registers to properly direct received data.

The copy mechanism is organized to take advantage of the data storage elements in the pipeline stages and data queues (on the order of a hundred samples or pixels) of the copy data path. The copy data path includes FRB, TE, PX, FP, FWQ, FBI.

FRB: The frame-buffer read buffer is a buffer for data read from FB memory.

FWQ: The frame-buffer write queue is a queue of FB memory requests (write address & data, or read address).

FBA: The frame-buffer addressing unit maps X,Y addresses to memory page and pixel/sample addresses.

FBI: The frame buffer interface is the FB memory controller, includes DMD cache (e.g., 3DRAM cache), global bus and DRAM page control.

In many embodiments, one issues as large a batch of copy read opcodes with filter center addresses as possible without deadlocking at the TE "join" point (where the filtered read data resulting from copy read opcodes and addresses is paired up with copy write opcodes and addresses), then switches to issuing a matching batch of copy write requests with display pixel addresses (which send the filtered pixel data down through the FP to be written to the display area of the FB); this process repeats until all of the samples have been filtered.

Figure 16:
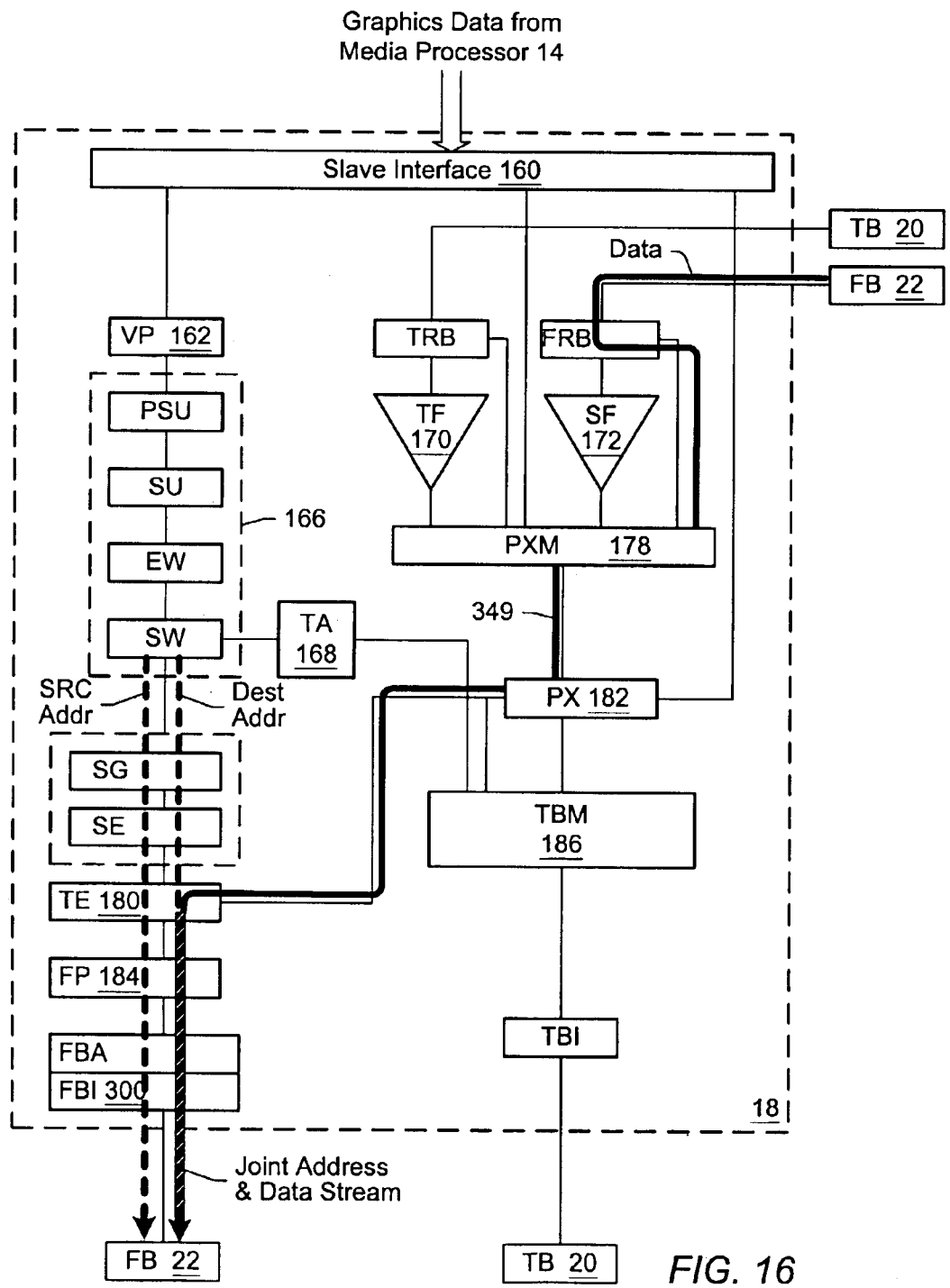
FIG. 16 illustrates one embodiment of a frame buffer to frame buffer copy operation with source address, destination address, data, and joint address-and-data flows highlighted.

FIG. 16 illustrates the FB-to-FB copy operation with source address, destination address, data, and joint address and data flows highlighted.

Figure 17:
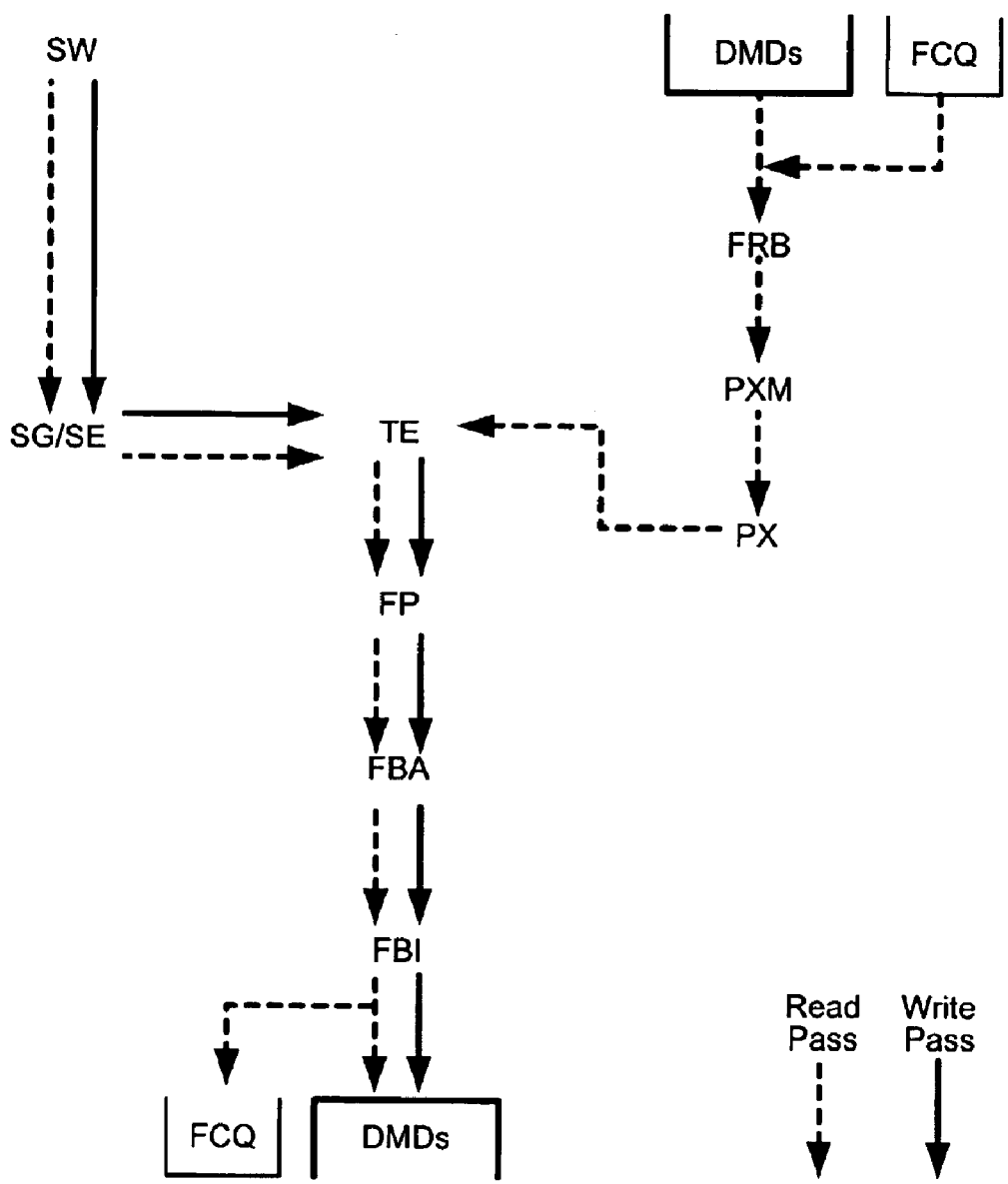
FIG. 17 illustrates the flow of opcodes in a supersample read pass.

FIG. 17 illustrates the flow of opcodes in a supersample read pass (supersample buffer to frame buffer).

Figure 18:
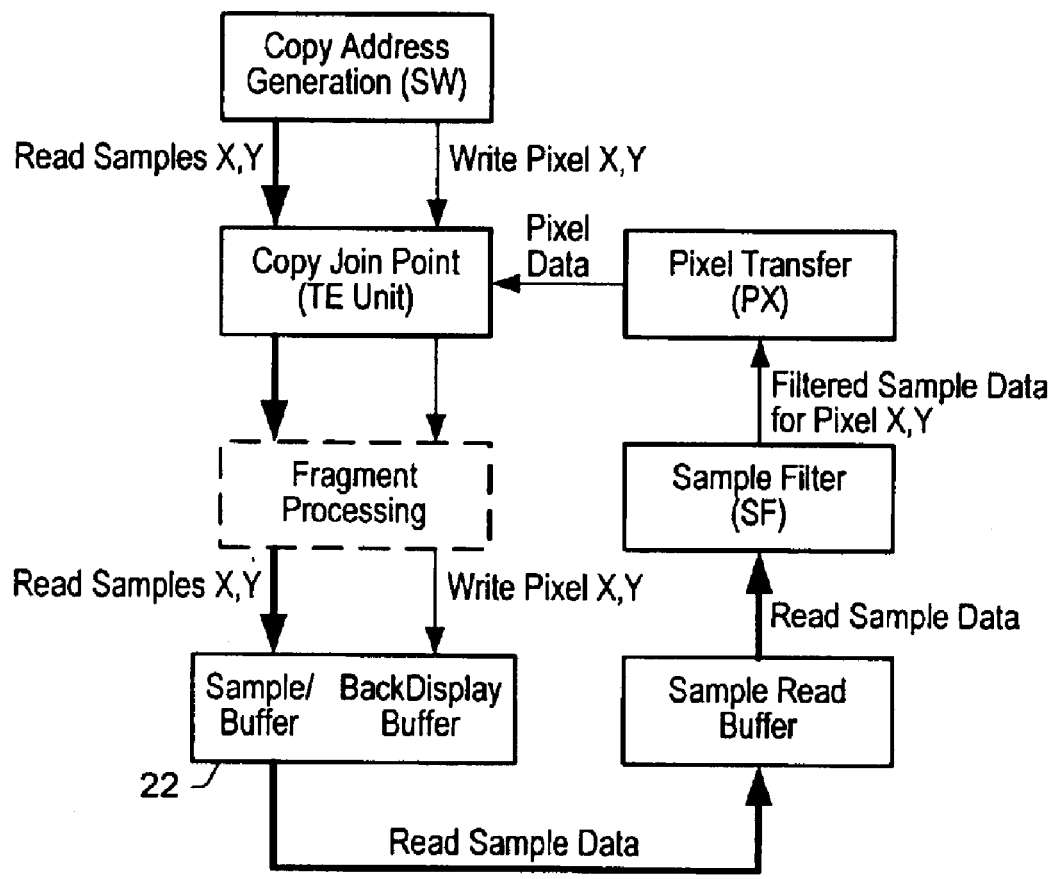
FIG. 18 summarizes the step of sample filtering and copying resultant pixels to the back display buffer in one set of embodiments.

FIG. 18 summarizes the step of sample filtering and copy to back display buffer.

The span walker SW generates read sample, filter sample and write pixel requests and addresses. Each burst of read & filter requests is followed by a burst of write requests.

The TE unit passes the read sample and filter sample requests though the fragment pipe to the sample buffer in the FB memory 22.

The FRB contains a sample read buffer to allow reuse of overlapping samples from previous circular filter operations when the filter footprint is larger than a single pixel.

The sample filter produces filtered pixels by convolving the samples. The RGB result can be up to 12 bits per component For more information on filtering of samples to generate pixels, please refer to the U.S. patent application Ser. No. 09/970,077, filed on Oct. 3, 2001, entitled "Programmable Sample Filtering for Image Rendering", invented by Burk et al., wherein is hereby incorporated by reference in its entirety.

The pixel transfer unit PX processes the filtered pixel data, applying gamma correction.

The PX pixel data is paired up with the SW write address and opcode and is sent down though the fragment pipeline to the "back" display buffer area of the double-buffered FB memory.

2.2.4 Swap Back and Front Display Buffers

When the filtering operations are complete, and thus, the filtered frame scene is in the "back" display buffer, a "swap display buffers" operation is executed to exchange the "front" and "back" buffer assignments, so that the new frame is visible and the old frame's display buffer is available to receive the next filtered frame when the process is repeated.

The buffer swap operation may be implemented by posting a new WID (window ID) entry into the window lookup table (WLUT).

Figure 19:
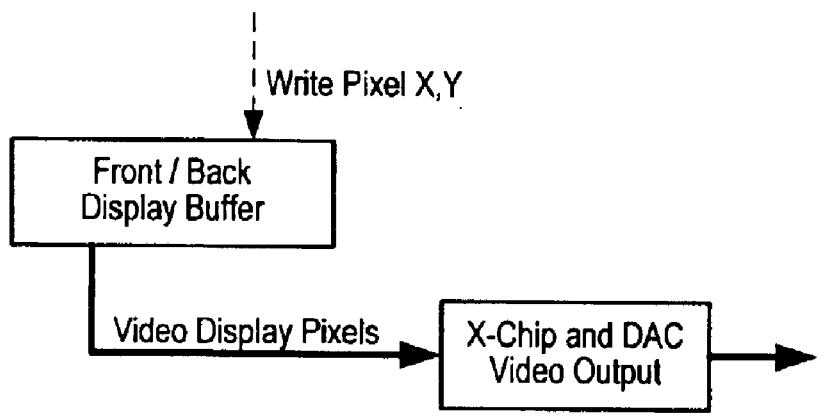
FIG. 19 illustrates the step of displaying data from the front half of the display buffer in one set of embodiments.

FIG. 19 summarizes the display step. The video output processor 24 (e.g. an X chip) reads pixels from the front segment of the display buffer, and sends the pixel to an RGB DAC (or video encoder). The RGB DAC converts the pixel stream into an analog video signal which is provided to a video output port for display.

2.3 Variations

Now that the basic flow for the sample render process, sample filter process and pixel display process has been described, a few variations on the theme will now be discussed.

2.3.1 Higher Precision Gamma Correction of Filtered Pixels

In the following discussion, it will be assumed that the sample buffer of the frame buffer can store up to $N_{bpc}=10$ bits per color component per sample. However, the principles described admit generalization to any positive integer value of the parameter $N_{bpc}$.

During the rendering step as illustrated in FIG. 9, the sample values are known to more bits of precision than the 10 bits per component that can be stored in the FB sample buffer. An optional "dithering" unit is included in the sample generator SG. When the "dithering" option is enabled, the R, G and B sample values may be dithered by one LSB ($2^{-10}$) based on the subpixel part of the sample's address (the fractional parts of X and Y). A fraction of the sample values will have one LSB added to R, G or B. The dither function causes the fraction of pixel sample values that are incremented by one LSB to be proportional to the low order sample value bits.

During the "filter sample buffer/copy results to display buffer" step (FIG. 18), the convolution operation has an "averaging" effect. In the case of a box filter, the filter may deliver exactly the equally weighted average of the sample values. Since the rendering step increased a fraction of the samples by one LSB, the average will be increased by that fraction times one LSB, and the missing information is "recovered". The same argument is approximately true for more complex filters. The net effect is to "recover" (or add to the stored 10 bits precision) approximately one bit for each doubling of the sample density. For sample densities of 4 or more, two bits are recoverable, and thus, the sample filter may send 12 significant bits for each color component to the PX unit. More generally, the number of recoverable bits varies as the base 2 logarithm of the sample density.

The PX unit contains a number of "12 bit in: 10 bit out" lookup tables for R, G and B. These may be loaded with a gamma correction function (to correct for the difference between linearly shaded sample values and the nonlinear characteristics of the monitor/human eye system). Many prior art systems only store 8 bits per component in their frame buffer, and the gamma correction function's nonlinearity causes an additional loss of precision for dark shaded areas; these systems suffer from "Mach band" quantization of dark shaded areas. The recovery of the extra two bits of input by the dithering mechanism described herein produces smoother shading of images than most systems can deliver, without the additional cost of more frame buffer memory and wider frame buffer memory busses.

For more information on averaging to recover precision from dithered samples, please refer to:

U.S. patent application Ser. No. 09/760,512, filed on Jan. 11, 2001, entitled "Recovering Added Precision from L-Bit Samples by Dithering the Samples Prior to an Averaging Computation", invented by Deering et al., which is hereby incorporated by reference in its entirety.

2.3.2 Stereovision

Stereovision systems render and display two views of the scene, one as seen from the left eye viewpoint and one as seen from the right eye viewpoint. This is accomplished by rendering the same scene geometry twice, once with a left eye perspective transform matrix, then again with a right eye perspective transform matrix. The two renderings are stored in two different display buffers. The two stored renderings may be displayed by two video channels respectively (e.g., for a "goggles" head mounted type of display). Optionally, the two stored renderings may be alternately displayed on the same display (e.g., while viewing with stereo glasses which have out of phase left and right eye liquid crystal "shutters" synchronized to the display updates).

The requirement for two display buffers increases the display memory required, but does not increase the sample buffer requirement, when the sample buffer is filtered and copied into the display buffer before swapping. This is not true for systems which filter at video refresh time, which require two sample buffers, one for each eye.

So, the "filter and copy" approach described herein supports stereovision without an expensive doubling of sample buffer memory requirements.

2.3.3 Clear While Filtering

The basic frame processing loop has the following form:
for each frame
    clear sample buff
    render sample buff
    filter sample buff to display buff
    swap display buff
next frame The total time per loop is:
clear_time+render_time+filter_copy_time+swap_time For teaching on how to perform the sample buffer clear operation in parallel with the sample filtering, please refer to:

U.S. patent application Ser. No. 10/066,397, filed on Jan. 31, 2002, entitled "Parallel Read with Source-Clear Operation", invented by Lavelle et al., which is hereby incorporated by reference in its entirety.

Figure 20:
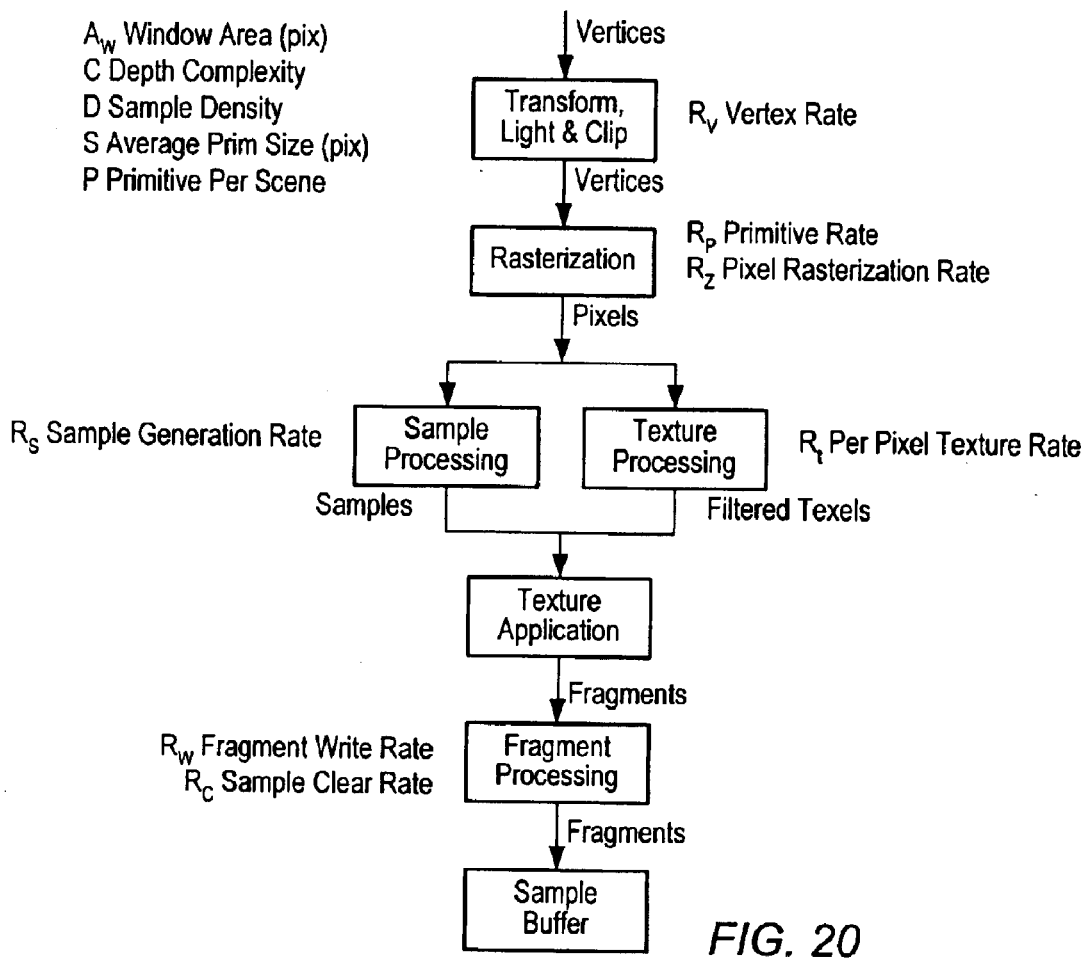
FIG. 20 illustrates a set of rendering performance parameters that are relevant to the rendering of samples into the sample buffer.

The Read-Clear-Write function (described in above-named application) when implanted in the FBI may be used to speed up the frame processing loop by combining the filtering of the sample buffer with the clearing of the sample buffer. The sample buffer is cleared just after the samples have been read to the sample filter. With the read-clear-write function, the frame processing loop looks like:
clear sample buff
  for each frame
    render sample buff
    filter sample buff to display buff while clear sample buff
    swap display buffer
next frame This puts the clear time in parallel with the filter time, so the total time per loop is:
render_time+max(filter_copy_time, clear_time)+swap_time For most filters, the clear time shorter than the filter time, so the clear time is "free". Thus, the expression above may simplify to:
render_time+filter_copy_time+swap_time 2.4 Rendering Performance Parameters To understand the performance of various approaches, it will be helpful to define some key performance parameters. FIG. 20 summarizes the rendering performance parameters. The following discussion gives typical values for one set of embodiments. However, a variety of other values may hold for other sets of embodiments.

- The vertex rate, Rv, is limited by the slowest of: the host program, host interface 11 (e.g., a NUPA bus), transform/light/clip microcode in the media processor, the interface between the media processor 14 and the hardware accelerator 18 (e.g., a SUPA bus). The vertex rate varies depending on the vertex type and the number of lights and may be limited by microcode. A typical value for Rv is 33 M vertices/sec.
- Isolated triangles have 3 vertices per triangle. For large triangle meshes, the number of vertices per triangle falls towards a limit of 0.5 vtx/tri. For long triangle strips, the limit is 1 vtx/tri. For short triangle strips, there are between 1 and 3 vtx/tri. For this discussion, long triangle strips are assumed.
- The primitive rate, Rp, may also be limited by the rasterization pipeline RP. A typical value for Rp is 33 M triangles/sec.
- The rasterizer's pixel shading rate, Rz, may be limited by the edge walker EW and span walker SW. A typical value for Rz is 666 M pixels/sec.
- The sample generation rate, Rs, may be limited by the sample generator SG and sample evaluator SE units. A typical value for Rs is 1333 M samples/sec, assuming "buddy" mode, or 666 M sample/sec without "buddy" mode.
- The texture processing rate, Rt, is limited mainly by the texture memory bandwidth and the texture filter type selected. A typical value for Rt is 166 M textured pixels/sec for a bilinear filter and one layer of texture. More complex filters and/or more texture layers may be considerably slower.
- The textured sample (fragment) write rate, Rw, may be limited by the fragment pipeline FP (also referred to herein as the fragment processor), FB interface and FB memory. By design, Rw is the same as Rs (1333 M samples/sec in "buddy" mode).

As mentioned above, if we assume long triangle strips, the number of vertices per triangle approaches one, so the vertex limit and the rasterization setup limit on triangle rate are approximately equal $$Rtri=\min(Rv/1, Rp)=33 \text{ Mtri/sec}$$

The sample fill rate may be limited by the slowest of: the sample generator SG, the texture processing pixel rate multiplied by the sample density, the rasterizer pixel rate multiplied by the sample density and the fragment write rate. But Rw is the same as Rs and Rz is much greater than Rt, so $$Rsfill=\min(Rs, D*Rt, D*Rz, Rw)=\min(Rs, D*Rt)$$

plugging in Rs=1333 M samples/sec (assuming "buddy" mode) and Rt=166 M textured pixels/sec (assuming a bilinear filter and one layer of texture), it follows that for sample densities (D) up to 8, sample fill rate is texture rate limited.

$$Rsfill=\min(Rs, D*Rt)=\min(1333, 166D) \text{ Msamp/sec}$$

The time to render a frame with P triangles in the scene (assumes the rest of the database has been view frustum culled by the host), $A_w$ window area, C depth complexity and D sample density is:

$$\text{render\_time}=\max(\text{tri\_time}, \text{fill\_time})$$

where $$\text{tri\_time}=P/Rp$$

$$\text{fill\_time}=(A_w*C*D)/\min(Rs, D*Rt)$$

The time to clear the sample buffer before rendering the frame with $A_w$ window area and D sample density is:

$$\text{clear\_time}=D*A_w/Rc=0.188 DAw \text{ nsec}$$

2.5 Filtering Performance Parameters

Figure 21:
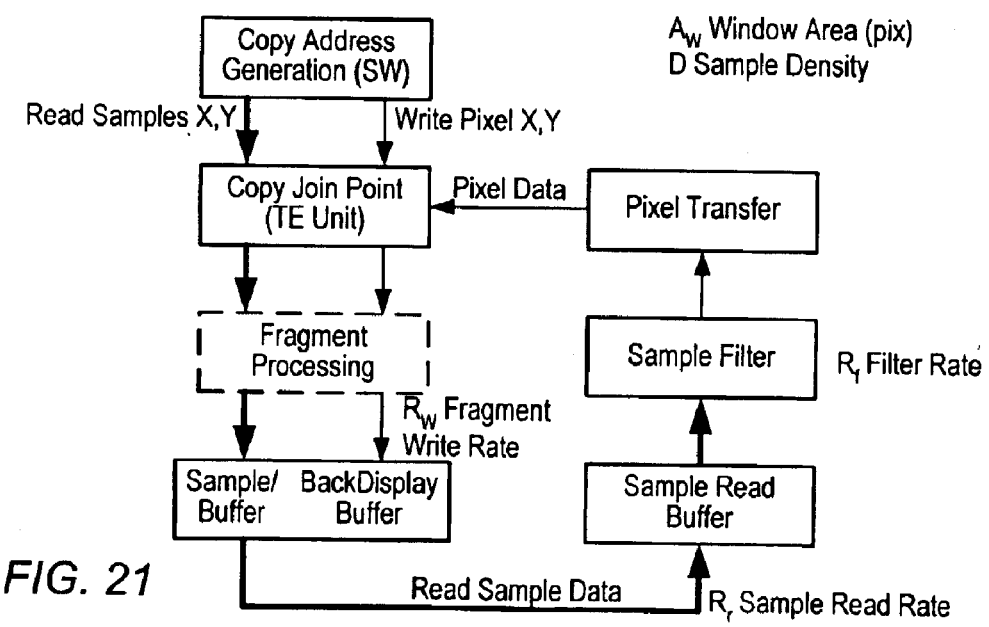
FIG. 21 illustrates a set of filtering performance parameters that are relevant to the filtering of samples from the sample buffer.

FIG. 21 illustrates filtering performance parameters.

- The sample read rate, $R_r$, may be limited by the FB interface and FB memory. A typical value for $R_r$ is 333 M samples/sec.
- The sample filter pixel rate, $R_f$, may be limited by the filter footprint, the sample density and the amount of caching in the sample read buffer.
- For a simple unmagnified box filter, with a footprint that exactly matches the pixel result, the filter rate may be limited to the read sample rate, $R_r$, divided by the sample density, D.
- For magnified box and circular filters, the number of samples involved in the convolution calculation increases as the square of the footprint radius, and the number of read samples increases in proportion to the radius. As the radius increases, the convolution calculation may become a bottleneck, and the filter rate may drop by a factor of two or more for more complex filters. This performance discussion will be limited to the faster box filter case.
- The fragment write rate, $R_w$, sets the time to write the results to the display buffer, which lowers the filter/copy rate. When writing pixels, this rate may be 666 Mpix/sec.

The total time to filter and copy the result for the unmagnified box filter is $$\text{filter\_time}=(A_w*D/R_r)+(A_w/R_w)$$

$$\text{filter\_time}=(3D+1.5)A_w \text{ nsec}$$

which approaches $3DA_w$ for higher sample densities.

3.0 Dynamic Allocation of Sample Buffer (SB) per Window Size

The size of the sample buffer in the FB memory may be dynamically adjusted in response to changes in the window size.

For a display of $W_d$ by $H_d$ pixels, one needs not less than (typically, a little more than) $W_d$ times $H_d$ of (double buffered) pixel display buffer memory in the FB (i.e. roughly the display size in pixels).

In a window system, one often renders to a window that is less than full screen in size. For a window of $W_w$ by $H_w$ pixels, one needs not less than (typically, a little more than) $D_s$ times $W_w$ times $H_w$ of (single buffered) sample buffer memory in the FB (i.e. roughly the window size times the sample density).

Since the capacity of the FB memory is finite (in one set of embodiments, 5.2 million samples/pixels of memory) and the FB memory is being shared between display and sample buffers, the maximum sample density is roughly the integer floor of { (FB size in pixels/samples minus display size in pixels) divided by (window size in pixels)}.

This means that lower resolution displays and/or smaller sized windows can support higher sample densities in a fixed size frame buffer.

Thus, software running on the host computer may monitor the current window size, and automatically adjust the sample density to get the most use out of the fixed size frame buffer. If the user chooses (or resizes to) a smaller window size, the host software may adjust the sample density up, and vice versa, by writing to an appropriate set of hardware registers in the graphics rendering system.

The hardware accelerator 18 may have one or more sample density registers which control the number of samples generated per pixel area. The sample generator SG may have a control register with a sample density field. The sample density field determines the number of sample positions generated per pixel area. The frame buffer addressing unit (FBA) may have a sample density register because it is responsible for mapping fragment addresses into memory page and data item addresses, and the mapping depends on the sample density. The sample filter may have a sample density register so it can grab the appropriate number of samples per pixel area for its filtering operations. The sample density registers are dynamically adjustable.

Host software may write to the one or more sample density registers in the hardware accelerator to change the sample density. In one embodiment, host software writes the same value to all the sample density registers.

Often windows are less than full screen in size. Thus, when the user selects a larger window, the image quality may be higher by virtue of having more pixels of resolution. Conversely, when the user makes the window smaller, the dynamic allocation mechanism maintains the image quality by using more samples per pixel.

As used herein, the term "multisample" is equivalent in meaning to "supersample".

As indicated by the examples in the Section 2.1.3, adjusting the sample buffer size to the window size (instead of trying to setup the sample buffer to correspond to the whole screen) allows significant increases in sample density. For a 1280×1024 display, a nearly full-screen window can support 2 samples/pixel in one pass, a 1000×1000 window can support 3 samp/pix, a 720×670 can support 8 samp/pix, for much better quality.

This mechanism of dynamically allocating the sample buffer memory to maximize sample density may be combined with the mechanisms described in the following sections: i.e. multiple passes for higher sample density and/or stereovision. The combination of dynamic memory allocation and multiple pass rendering allows the user to specify a target quality level (e.g. a desired sample density), and the system performs the minimum number (or close to the minimum number) of passes per frame needed to achieve the target quality level, considering the current window size. Alternatively, the user may specify a minimum performance target (e.g., a maximum frame render time), and the system delivers the maximum possible sample density (or close to the maximum possible sample density) while performing better than the minimum performance target (e.g., while rendering frames within the maximum frame rendering time).

4.0 Reuse of Sample Buffer for Stereovision

One common method of stereovision (described in Section 2.3.2) is accomplished by rendering the same scene geometry twice, once with a left eye perspective transform matrix, then again with a right eye perspective transform matrix. The two renderings are stored in two different display buffers, and may be alternately displayed on the same display (e.g., while viewing with stereo glasses which have out of phase left and right eye liquid crystal "shutters" synchronized to the display updates).

The two display buffers consume more of the frame buffer memory. However, the "filter, then copy" approach described herein (i.e. the approach of rendering samples into offscreen sample buffer, filtering from sample buffer into back pixel display buffer, and then performing display buffer switch) does not increase the sample buffer requirement. Thus, stereovision may be supported without an expensive doubling of sample buffer memory.

Figure 22:
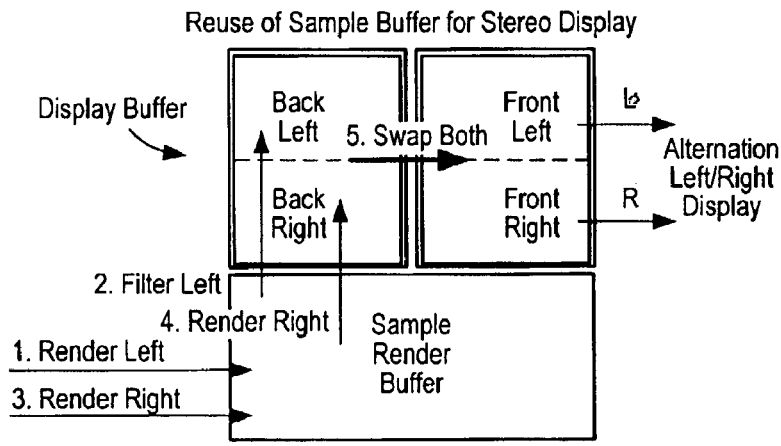
FIG. 22 illustrates the reuse of the sample buffer for stereo display in one set of embodiments.

FIG. 22 illustrates reuse of the sample buffer for stereo display.

A host driver routine may allocate the left and right display buffers in the FB memory, and then, allocate the remaining FB memory as a single reusable sample buffer. A software application (running on the host computer) may implement the following rendering loop:

for each scene frame
  for eye=left, right
    clear sample buff
    set view transform matrix=xm(eye)
    render sample buff
    filter samp buff to disp buff (rear, eye)
  next eye
  swap front & rear display buffs (both eyes)
next frame This approach doubles the sample density for a fixed sample buffer size.

5.0 Reuse of SB for Increased Sample Density

The sample buffer capacity is no more than the remainder of the frame buffer memory after subtracting the display buffer requirements. For a given size window, that limits the maximum sample density that can be supported in one rendering pass.

But the "filter, then copy" approach described herein allows a graphics application to reuse the sample buffer to achieve higher sample densities without increasing the sample buffer memory size. The graphics application may use the graphics rendering system to render multiple regions within a scene in multiple passes, one region per pass, at higher sample densities (than if the whole scene were rendered in a single pass), and build up the entire scene in the rear display buffer before swapping the display buffers.

This approach makes it possible to trade more rendering passes for higher sample density. This approach uses a (screen_resolution) double-buffered memory plus a sample buffer memory with size:

(sample_density*window_size/number_of_passes).

5.1 Algorithm

Figure 23:
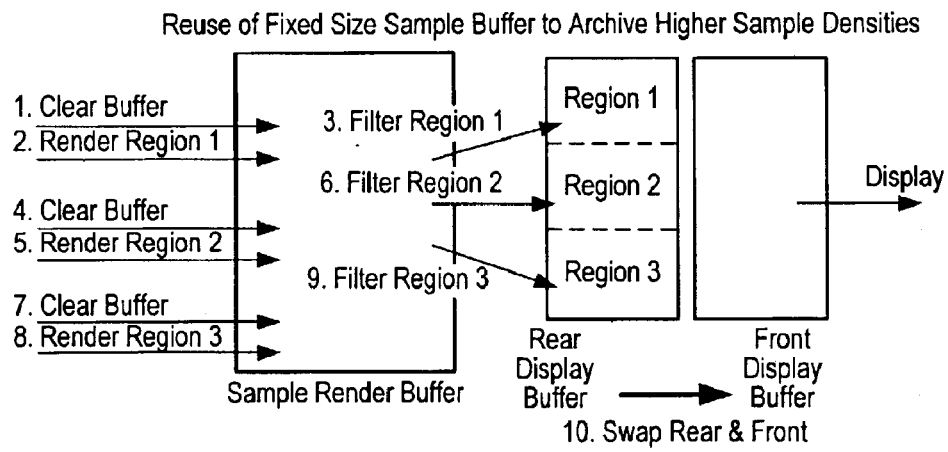
FIG. 23 illustrates the reuse of a fixed size sample buffer to achieve higher sample densities in another set of embodiments.

FIG. 23 illustrates reuse of a fixed size sample buffer to achieve higher sample densities.

After allocating the display buffers in the FB memory, host software (e.g. a host driver routine) may allocate the remaining FB memory as a single reusable sample buffer. Host software may divide the back display buffer into N adjacent regions, wherein N is the number of passes to be performed per scene frame. Thus, N is an integer greater than or equal to one. Due to the shape of the display memory allocation pages (one embodiment of which is exemplified by the table of FIG. 6), it may be beneficial to divide the display back buffer into N regions with approximately equal size. A graphics application may then execute the following rendering loop:

for each scene frame
    for region K=1 . . . N
        clear sample buff
        set view frustum/clipping to region K
        render scene to sample buffer
        filter sample buff to region K in back disp buff
    next region
    swap display buffers
next frame The rendering to the sample buffer is performed at the desired sample density, which can be up to N times higher than possible if only one pass were used.

As indicated in Section 2.1.2, the driver software may allocate a sample buffer a bit larger than the region size (i.e. sample density times window width times window height), because of the rounding up to integer FB memory page sizes and also because the sample filter (in certain modes) may have a footprint (or support area) which spills outside the region (e.g. when computing pixels on or near the region's edges). For the simple unmagnified box filter (covering a single pixel's area), no extra border is needed.

5.2 Sample Density Examples

For a single-headed 1280×1024 non-stereo display, the display buffer uses (ceiling(1280/320)*ceiling(1024/16))=256 pages of FB memory. That leaves (1024−256)=768 pages for a sample buffer.
    A single pass can support a 960 by 900 pixel window at a sample density of 4 since (ceiling(960/80)*ceiling(900/16))=684 pages which is less than 768 pages.
    Two passes can support a 960 by 900 pixel window at a sample density of 8 since (ceil(960/40)*ceil(450/16))=696 pages which is less than 768 pages.
    Four passes can support a 960 by 900 pixel window at a sample density of 16 since (ceil(960/40)*ceil(225/8))=696 pages which is less than 768 pages.

For a single-headed 960×680 stereo display, the display buffer uses (ceil(960/320)*ceil(680/8))=255 pages of FB memory. That leaves (1024−255)=769 pages for a sample buffer.
    A single pass can support a 960 by 680 full screen display at a sample density of 5 since (ceil(960/80)*ceil(680/12))=684 pages which is less than 769 pages.
    Two passes can support a 960 by 680 full screen display at a sample density of 10 since (ceil(960/40)*ceil(340/12))=696 pages which is less than 769 pages.
    Three passes can support a 960 by 680 full screen display at a sample density of 16 (ceil(960/40)*ceil(227/8))=696 pages which is less than 769 pages.

5.3 Performance Analysis

The host application may set the view frustum to match the region used in each given pass. Thus, the parts of the scene that do not project onto the current region in the display buffer will be clipped away. With this strategy, the rendering and filtering time for each pass decreases as the region size decreases. It is significant to note that the total time to rasterize and filter the entire scene (all N regions) at the higher sample density can approach the time for a single pass at high sample density on a more expensive system with more memory.

Buffer Clear Time. The time to clear the sample buffer before rendering the frame with window area $A_w$ and sample density D may be approximated (at least in some embodiments) by the expression:

$$\text{clear\_time} = D * A_w / R_c = 0.188 D A_w \text{ nsec.}$$

If the graphics application runs N passes into N corresponding regions, each with area $A_w/N$, at sample density $N*D$, the total clear time (for the N passes) increases in proportion to the sample density ratio (ND/D):

$$\text{clear\_time} = N * D * A_w / R_c = 0.188 N D A_w \text{ nsec}$$

Filter/Copy Time. From Section 2.5, recall that the total time to filter and copy the result for the unmagnified box filter is $$\text{filter\_time} = (A_w * D / R_r) + (A_w / R_w)$$

$$\text{filter\_time} = (3D + 1.5) A_w \text{ nsec.}$$

If the graphics application runs N passes into N corresponding regions, each with area $A_w/N$, at sample density $N*D$, the total filter/copy time (for the N passes) increases in proportion to the sample density ratio (ND/D):

$$\text{filter\_time} = N * (3ND + 1.5)(A_w/N) \text{ nsec}$$

$$\text{filter\_time} = (3ND + 1.5) A_w \text{ nsec}$$

which approaches $3NDA_w$ for higher sample densities and multiple passes.

Sample Fill Time. From Section 2.4, recall that $$R_{sfill} = \min(R_s, D * R_t) = \min(1333, 166D) \text{ Msamp/sec.}$$

Thus, for single bilinear textures, when D <8, the system may be texture rate limited $$R_{sfill}(D<8) = 166D \text{ Msamp/sec,}$$

and when D>=8, the system may be sample rate limited.

$$R_{sfill}(D>=8) = 1333 \text{ Msamp/sec.}$$

For more complex texturing, the threshold for D may be even higher. If D<8, the time to fill the pixels in window size $A_w$ in one pass at sample density D is $$\text{fill\_time} = (A_w * C * D) / 166 * D = (A_w * C) / 166 \text{ microsec}$$

Alternatively, if the graphics application runs N passes into N corresponding regions, each with area $A_w/N$, at sample density $N*D$, (assuming ND is still less than or equal to 8), the total fill time (for the N passes) does not increase $$\text{fill\_time} = N * ((A_w/N) * C / 166 = (A_w * C) / 166 \text{ microsec.}$$

Thus, for single bilinear texturing, multiple passes can increase the sample density to 8 without increasing the fill time. For more complex texturing, the sample density can be even higher without increasing the fill time.

Triangle Rasterization Setup Time. Recall that the time to set up rasterization for a frame with P triangles surviving host view frustum culling and hardware clipping (in other words, the triangles in the scene that are inside the window), window area $A_w$, depth complexity C and sample density D is:

$$\text{tri\_time}=P/R_p=3P \text{ nsec}.$$

If the scene has been partitioned into N regions, on average a few more than P/N of the primitives visible in window $A_w$ will fall in each region (i.e. primitives which straddle the region boundaries will lie partly in both regions). Thus, the total time to render N regions will not be increased significantly (at least for P large, and N small)

$$\text{tri\_time}=N*3((P/N)=3P \text{ nsec}$$

Vertex Processing Time.

If the host were to perform "perfect" view frustum culling which is fully overlapped with the hardware processing, then when the scene is partitioned into N regions, a few more than V/N of the vertices will fall (on average) into each region (primitives which straddle the region boundaries will lie partly in both regions). The total time to transform and light vertices for the N regions will not be increased significantly (for V large, and N small).

(lower bound) $\text{vtx\_time}=N*3(V/N)=3V$ nsec

If the view frustum culling is less than perfect (or none at all), then the vertices processing load may increase by as much as a factor of N.

(upper bound) $\text{vtx\_time}=N*3P=3PN$ nsec

Frame Time. Putting the pieces together, the total animation frame time per loop is:

$$\text{frame\_time}=\text{clear\_time}+\text{render\_time}+\text{filter\_time}+\text{swap\_time}$$

Animation frame rate is simply the inverse of animation frame time.

The graphics rendering system may use indirection via a window lookup table to perform the double-buffered buffer swap. Thus, swap_time is insignificant (merely the time to update a table entry). If the double buffer swap is intentionally synchronized to the display retrace (for smoother animation), then swap_time simply has the effect of quantizing the total frame_time to be an integer multiple of the display frame time. In that case, the time spent waiting for the next vertical retrace can mask moderate increases in the other three times without increasing the total animation frame time.

Note that the exemplary values quoted herein for various processing rates are not meant to be limiting. These processing rates may achieve values in a wide variety of ranges from one embodiment to the next.

SUMMARY

When N passes are used to increase sample density without adding sample memory:

Sample buffer clear and filter times increase in proportion to the sample density just as they would if more memory were used).

Below a threshold (sample density of 8 in this example, set by the relative performance and the parallel functioning of the sample and texture processing paths as illustrated in FIG. 20), sample fill time does not increase.

Triangle Rasterization time does not increase significantly (a few triangles that fall on the region seams are processed twice).

Vertex Processing time increases by no more than a factor of N, but may approach an insignificant increase with efficient view frustum culling before the graphics processor.

This means that for scenes that are fill rate limited (a common case), sample density can be increased without adding memory and without significant performance penalty.

For cases that are vertex rate limited, the performance penalty is no worse than a factor of N, and may be reduced by view frustum culling.

Even when significant performance reductions occur, this method permits trading performance for higher sample densities (i.e. better quality). Sample densities can be increased beyond the limits of memory, whether they be cost or technology limits.

6.0 Stereovision and Increased Sample Density

A graphics application may configure the graphics rendering system to exploit both "reuse of the sample buffer for stereovision" (Section 4.0) and "reuse of the sample buffer for increased sample density" (Section 5.0)

Figure 24:
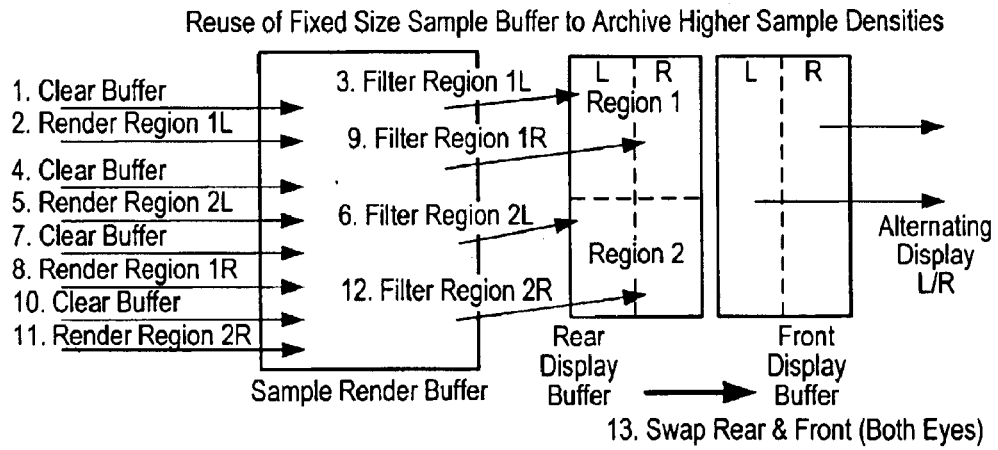
FIG. 24 illustrates multi-pass rendering to achieve higher sample densities in a set of stereo embodiments.

FIG. 24 illustrates the reuse of sample buffer to acheive higher sample densities.

for each scene frame
   for eye=left, right
     set view transform matrix=xm(eye)
     for region=1 . . . N
       clear sample buff
       set view frustum/clipping to region N
       render scene to sample buffer
       filter samp buf to disp buf(back,eye)reg N
     next region
   next eye
   swap front & rear display buffs (both eyes)
next frame And, as mentioned in Section 3.0 (i.e., "Dynamic Allocation of SB per Window Size"), a graphics application may be configured to combine either or both techniques (i.e. reuse of SB for stereo vision and/or reuse of SB for increased sample density) with dynamic allocation based on current window size and user preferences (target sample density or target frame rate).

What is claimed is:

1. A graphics system comprising:

a frame buffer, wherein the frame buffer includes a sample buffer and a double-buffered display area;

a hardware accelerator coupled to the frame buffer, and configured (a) to receive primitives, (b) to generate samples for the primitives based on a dynamically adjustable sample density value, (c) to write the samples into the sample buffer, (d) to read the samples from the sample buffer, (e) to filter the samples to generate pixels, (f) to store the pixels in a back buffer of the double-buffered display area;

wherein the hardware accelerator includes a frame buffer address unit configured to map fragment coordinates to memory addresses of the frame buffer, wherein the frame buffer address unit includes dynamically programmable registers which control the mapping between fragment addresses and memory addresses;

wherein a program executing on a host computer is configured to dynamically update the programmable registers to reallocate the sample buffer in the frame buffer in response to user input specifying a change in one or more window size parameters, wherein the program reallocates the sample buffer so as to achieve a maximum sample density.

2. The graphics system of claim 1, wherein memory devices in the frame buffer memory have parallel read and write busses, wherein the hardware accelerator is configured to perform (d) in parallel with a clear operation on source blocks in the sample buffer.

3. A method for controlling a graphics accelerator, wherein the graphics accelerator is configured to render samples into an available space of a frame buffer based on a programmable sample density, to filter the samples from the sample buffer into a double-buffered display area of the frame buffer, the method comprising:

(a) receiving input defining width and height of a window;

(b) computing a first number of memory allocation pages that cover the window horizontally based on the window width and a sample density estimate;

(c) computing a second number of memory allocation pages that cover the window vertically based on the window height and the sample density estimate;

(d) multiplying the first number and second number to determine a third number of memory allocation pages;

(e) performing (b), (c) and (d) one or more times to maximize the sample density estimate subject to the condition that the third number of memory allocation pages fit within the available space of the frame buffer;

(f) reprogramming the sample density of the graphics accelerator with maximized sample density estimate.

4. The method of claim 3, wherein the available space of the frame buffer is space in the frame buffer not occupied by the double-buffered display area.

5. A graphics system comprising:

a hardware accelerator;

a frame buffer coupled to the hardware accelerator, wherein the frame buffer includes a sample buffer and a double-buffered display area;

wherein the hardware accelerator is configured (a) to receive primitives, (b) to generate samples for the primitives based on a programmable sample density value which is dynamically adjustable, (c) to write the samples into the sample buffer, (d) to read the samples from the sample buffer, (e) to filter the samples to generate pixels, (f) to store the pixels in a back buffer of the double-buffered display area;

a video output processor configured to read pixels from a front buffer of the double-buffered display area, wherein the hardware accelerator and the video output processor are configured to execute a buffer swap of the front and back buffers of the double-buffered display area in response to a swap command from a host computer;

wherein the frame buffer comprises a plurality of random access memory (RAM) devices, wherein the video output processor is coupled to a subset of the RAM devices, wherein the double-buffered display area of the frame buffer is allocated within the subset of RAM devices.

6. The graphics system of claim 5, wherein the hardware accelerator couples to each of said plurality of RAM devices, wherein a size of the sample buffer and page boundaries of the sample buffer are programmable.

7. The graphics system of claim 5, wherein the RAM devices of said plurality are dynamic random access memories.

8. The graphics system of claim 5, further comprising one or more processing units configured to execute stored microcode, wherein, in response to execution of the stored microcode, the one or more processing units are configured to perform transform and lighting operations on vertices of said primitives.

9. The graphics system of claim 5, wherein the hardware accelerator includes a set of programmable registers that determine the location and size of the sample buffer within the frame buffer.

10. A method comprising:

(a) receiving input defining width and height of an adjusted window;

(b) computing a first number of memory allocation pages that cover the adjusted window horizontally based on the adjusted window width and a sample density estimate;

(c) computing a second number of memory allocation pages that cover the adjusted window vertically based on the adjusted window height and the sample density estimate;

(d) multiplying the first number and second number to determine a third number of memory allocation pages;

(e) performing (b), (c) and (d) one or more times to maximize the sample density estimate, within a set of sample densities achievable by a graphics accelerator, subject to the condition that the third number of memory allocation pages is less than or equal to an amount of available page space;

(f) writing the maximized sample density to the graphics accelerator.

11. The method of claim 10 wherein the available page space amount is a difference between a page capacity of the frame buffer and a page utilization amount of a double-buffered display area of a frame buffer.

12. The method of claim 10 further comprising writing the maximized value of the first number and the second number to the graphics accelerator.

13. The method of claim 10 further comprising writing the maximized value of the third number to the graphics accelerator.

14. The method of claim 10 further comprising repeating (a), (b), (c), (d) and (e) each time a user adjusts an onscreen window.

15. The method of claim 10 further comprising the graphics accelerator:

rendering samples into the sample storage area based on the maximized sample density, and filtering the samples from the sample storage area to generate displayable pixels and storing the displayable pixels into a double-buffered display area of a frame buffer.

16. The method of claim 15, wherein the available page space amount equals a difference between a capacity of the frame buffer and a size of the double-buffered display area.

17. The method of claim 15, further comprising reading and displaying the displayable pixels from the double-buffered display area.

18. The method of claim 10, wherein the memory allocation pages have a page width and page height in pixels that depends on the sample density estimate.

19. The method of claim 10, wherein (a) through (e) are performed by a host computer coupled to the graphics accelerator through a host bus.

* * * * *